(12) United States Patent
Unagami et al.

(10) Patent No.: US 9,288,063 B2
(45) Date of Patent: Mar. 15, 2016

(54) UNAUTHORIZED CONNECTION DETECTING DEVICE, UNAUTHORIZED CONNECTION DETECTING SYSTEM, AND UNAUTHORIZED CONNECTION DETECTING METHOD

(71) Applicant: Panasonic Corporation, Osaka (JP)

(72) Inventors: Yuji Unagami, Osaka (JP); Motoji Ohmori, Osaka (JP); Natsume Matsuzaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 148 days.

(21) Appl. No.: 14/130,502

(22) PCT Filed: Mar. 11, 2013

(86) PCT No.: PCT/JP2013/001571
§ 371 (c)(1),
(2) Date: Jan. 2, 2014

(87) PCT Pub. No.: WO2013/179534
PCT Pub. Date: Dec. 5, 2013

(65) Prior Publication Data
US 2014/0129829 A1    May 8, 2014

(30) Foreign Application Priority Data
May 29, 2012  (JP) ................................ 2012-122415

(51) Int. Cl.
*H04L 29/06*  (2006.01)
*H04L 9/32*  (2006.01)
(Continued)

(52) U.S. Cl.
CPC .............. *H04L 9/3268* (2013.01); *B60L 1/003* (2013.01); *B60L 3/0046* (2013.01); *B60L 3/04* (2013.01);
(Continued)

(58) Field of Classification Search
CPC ........................... H04L 63/0428; H04L 29/06

USPC ......................................................... 713/153
See application file for complete search history.

(56) References Cited

U.S. PATENT DOCUMENTS 8,285,117 B2    10/2012  Ueda et al.
2009/0234599 A1*  9/2009  Watanabe .................... 702/63
(Continued)

FOREIGN PATENT DOCUMENTS

JP    2000-242169    9/2000
JP    3726259    12/2005
(Continued)

OTHER PUBLICATIONS

International Search Report issued May 28, 2013 in International (PCT) Application No. PCT/JP2013/001571.
(Continued)

*Primary Examiner* — Anthony Brown
(74) *Attorney, Agent, or Firm* — Wenderoth, Lind & Ponack, L.L.P.

(57) ABSTRACT

An unauthorized connection detecting device which detects an unauthorized charge/discharge device includes: a time information obtaining unit obtaining, as time information, information from a first charge/discharge device, the information indicating at least one of an issuing date of a first certificate which is a public key certificate and an issuing date of a certificate revocation list held by the first charge/discharge device; an expiration date obtaining unit obtaining expiration date information from a second charge/discharge device, the expiration date information indicating an expiration date of a second certificate which is a public key certificate held by the second charge/discharge device; and an unauthorization detecting unit detecting whether or not the second charge/discharge device is the unauthorized charge/discharge device by comparing the time information with the expiration date information.

13 Claims, 15 Drawing Sheets

(51) Int. Cl.
*B60L 11/18* (2006.01)
*H02J 7/00* (2006.01)
*B60L 1/00* (2006.01)
*B60L 3/00* (2006.01)
*B60L 3/04* (2006.01)
*B60L 3/12* (2006.01)
*G07F 15/00* (2006.01)
*H04L 29/08* (2006.01)

(52) U.S. Cl.
CPC ............... *B60L 3/12* (2013.01); *B60L 11/1816* (2013.01); *B60L 11/1844* (2013.01); *B60L 11/1846* (2013.01); *B60L 11/1848* (2013.01); *B60L 11/1857* (2013.01); *B60L 11/1859* (2013.01); *B60L 11/1861* (2013.01); *G07F 15/005* (2013.01); *H02J 7/0004* (2013.01); *H04L 63/0823* (2013.01); *H04L 67/12* (2013.01); *B60L 2240/12* (2013.01); *B60L 2240/34* (2013.01); *B60L 2240/545* (2013.01); *B60L 2240/547* (2013.01); *B60L 2240/549* (2013.01); *B60L 2240/72* (2013.01); *B60L 2240/80* (2013.01); *B60L 2250/10* (2013.01); *B60L 2260/44* (2013.01); *B60L 2270/32* (2013.01); *H04L 2209/84* (2013.01)

(56) References Cited

U.S. PATENT DOCUMENTS

| | | |
|---|---|---|
| 2010/0046915 A1 | 2/2010 | Ueda et al. |
| 2010/0115267 A1 | 5/2010 | Guo et al. |
| 2010/0268944 A1 | 10/2010 | Ueda et al. |
| 2011/0144844 A1* | 6/2011 | Ishibashi .................. 701/22 |
| 2011/0185198 A1 | 7/2011 | Ukita et al. |
| 2012/0049786 A1 | 3/2012 | Kurimoto |
| 2013/0099744 A1 | 4/2013 | Falk et al. |

FOREIGN PATENT DOCUMENTS

| | | |
|---|---|---|
| JP | 2010-049514 | 3/2010 |
| JP | 2010-200528 | 9/2010 |
| JP | 4600544 | 12/2010 |
| JP | 2011-024293 | 2/2011 |
| JP | 2011-155712 | 8/2011 |
| JP | 2012-050267 | 3/2012 |
| WO | 2009/093571 | 7/2009 |
| WO | 2012/004168 | 1/2012 |

OTHER PUBLICATIONS

Extended European Search Report issued Aug. 14, 2015 in corresponding European Patent Application No. 13797764.1.

* cited by examiner

FIG. 3A

| Second certificate ID | Verification result |
|---|---|
| ID1 | OK |
| ID2 | OK |
| ID3 | NG |
| ID4 | OK |
| ... | ... |

| Date | Second certificate ID | Number of charges and discharges | Amount of charge and discharge | ... |
|---|---|---|---|---|
| T1 | ID1 | +N1 | +P1 | |
| T2 | ID1 | -N2 | -P2 | ... |
| T3 | ID1 | -N3 | -P3 | |
| T4 | ID1 | +N4 | +P4 | |
| ... | ... | ... | ... | ... |

(196)

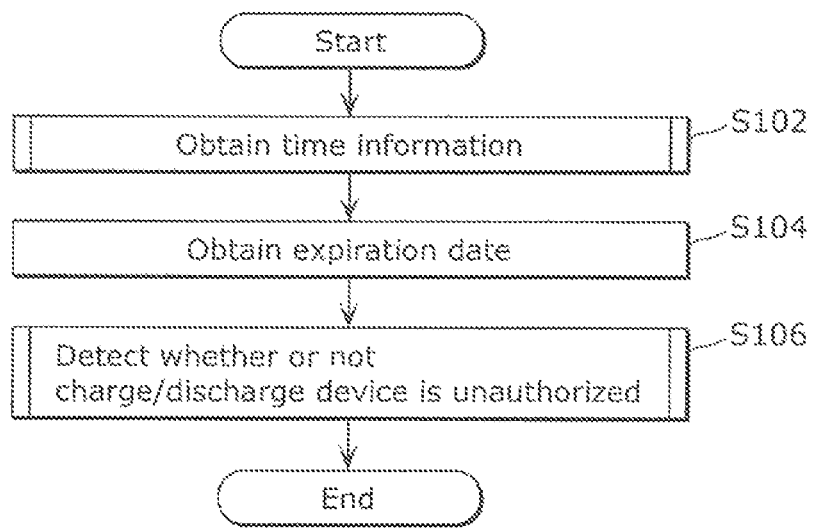

UNAUTHORIZED CONNECTION DETECTING DEVICE, UNAUTHORIZED CONNECTION DETECTING SYSTEM, AND UNAUTHORIZED CONNECTION DETECTING METHOD

TECHNICAL FIELD

The present invention relates to an unauthorized connection detecting device, an unauthorized connection detecting system, and an unauthorized connection detecting method for detecting whether or not a charge/discharge device connected to the unauthorized connection detecting device is an unauthorized charge/discharge device, the charge/discharge device being included in charge/discharge devices for charging or discharging the secondary battery with power.

BACKGROUND ART

In recent years, secondary batteries are used for various purposes including electric vehicles. The secondary batteries are included in a device (hereinafter referred to as power storage device), such as an electric vehicle, and the power storage device is connected to a charge/discharge device to be charged or discharged.

In the case where the charge/discharge device is not an authentic one but an unauthorized one, the unauthorized device could develop performance problems, burst into flame, cause electric leakage, and could be misused for theft of electricity. Moreover, when the unauthorized charge/discharge device and a power storage device are connected with each other, information may be exchanged therebetween, which could cause information leakage. In relation to the above problems, some techniques have been proposed to prevent connections to unauthorized devices (see Patent Literatures 1 to 3, for example).

CITATION LIST

Patent Literature

[PTL 1]
Japanese Patent No. 3726259
[PTL 2]
Japanese Patent No. 4600544
[PTL 3]
WO 2009/093571

SUMMARY OF INVENTION

The above conventional techniques have a problem in that the techniques cannot detect an unauthorized charge/discharge device into which a cryptographic module of an authentic product is introduced in an unauthorized manner, and thus fail to prevent a connection to the unauthorized charge/discharge device.

The present invention is conceived in view of the above problems and aims to provide an unauthorized connection detecting device, an unauthorized connection detecting system, and an unauthorized connection detecting method capable of detecting an unauthorized charge/discharge device with a cryptographic module of an authentic product introduced thereinto in an unauthorized manner.

In order to achieve the above aim, an unauthorized connection detecting device according to an aspect of the present invention detects whether or not a charge/discharge device connected to the unauthorized connection detecting device is an unauthorized charge/discharge device, the charge/discharge device being included in charge/discharge devices for charging or discharging a secondary battery with power. The unauthorized connection detecting device includes: a time information obtaining unit which obtains, as time information, information from a first charge/discharge device when the unauthorized connection detecting device is connected to the first charge/discharge device, the information indicating at least one of (i) an issuing date of a first certificate which is a public key certificate held by the first charge/discharge device for authentication and (ii) an issuing date of a certificate revocation list including revoked public key certificates and held by the first charge/discharge device, and the first charge/discharge device being included in the charge/discharge devices; an expiration date obtaining unit which obtains expiration date information from a second charge/discharge device when the unauthorized connection detecting device is connected to the second charge/discharge device, the expiration date information indicating an expiration date of a second certificate which is a public key certificate held by the second charge/discharge device for authentication, and the second charge/discharge device being included in the charge/discharge devices; and an unauthorization detecting unit which detects whether or not the second charge/discharge device is the unauthorized charge/discharge device by comparing the time information with the expiration date information.

It is noted that such a general and specific aspect may be implemented in the form of a system, a method, an integrated circuit, a computer program, or a non-transitory computer-readable recording medium such as a CD-ROM, or any combination of systems, methods, integrated circuits, computer programs, or computer-readable recording media.

The present invention successfully implements an unauthorized connection detecting device capable of detecting an unauthorized charge/discharge device with a cryptographic module of an authentic product introduced thereinto in an unauthorized manner.

BRIEF DESCRIPTION OF DRAWINGS

FIG. 3A shows an example of verification results according to the embodiment of the present invention.

FIG. 3B exemplifies a charge/discharge history according to the embodiment of the present invention.

FIG. 4 depicts a flowchart exemplifying how the unauthorized connection detecting device according to the embodiment of the present invention detects an unauthorized charge/discharge device.

DETAILED DESCRIPTION OF INVENTION

Figure 1:
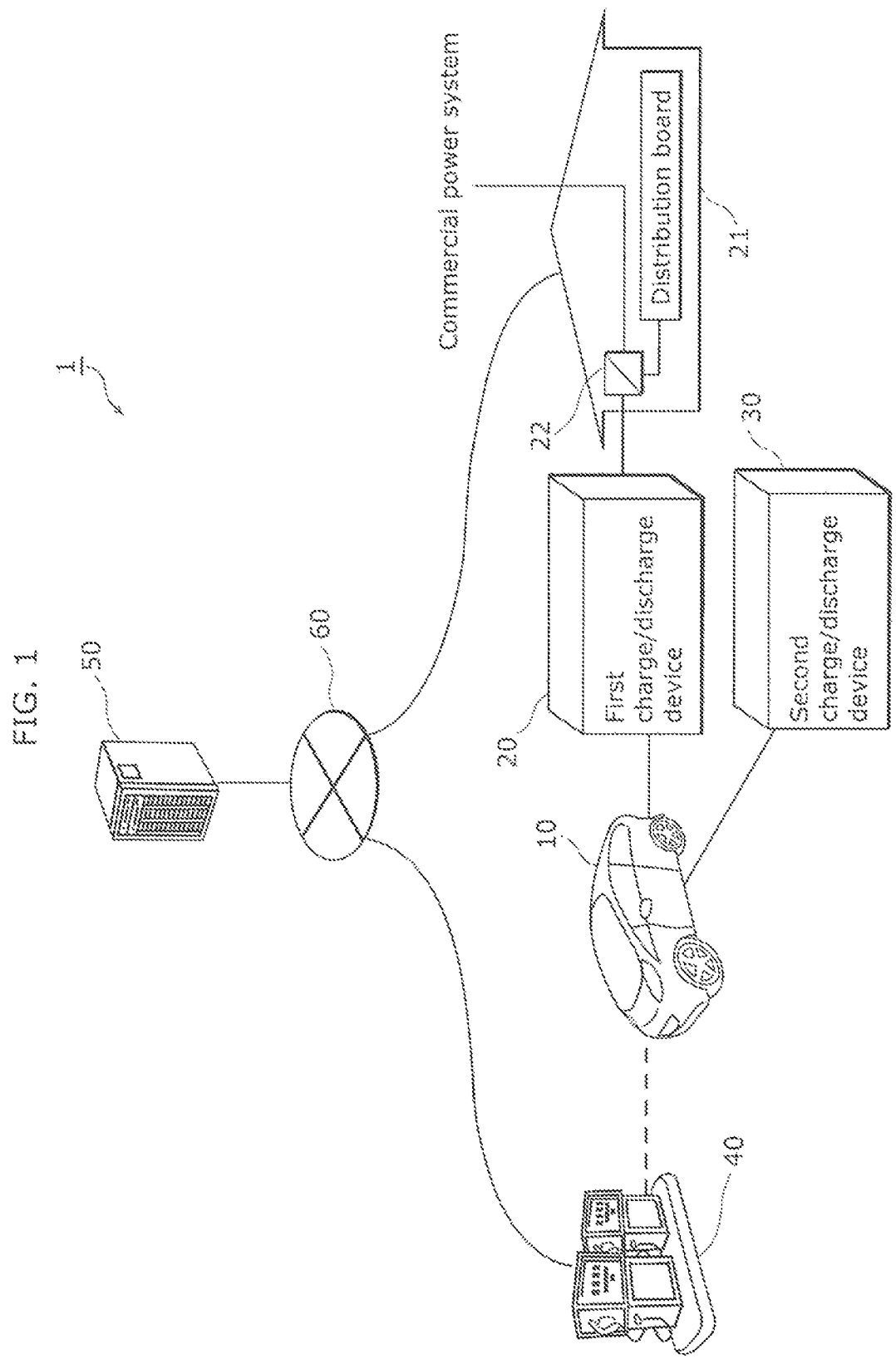
FIG. 1 shows a structure of an unauthorized connection detecting system according to an embodiment of the present invention.

[Embodiment]
[Underlying Knowledge Forming Basis of the Present Invention]

In relation to the techniques disclosed in the Background Art section for the prevention of the connection to an unauthorized device, the inventors have found the problem below.

When a cloned cryptographic module (a secret key and a public key certificate) of an authentic product is introduced into an unauthorized charge/discharge device in an unauthorized manner, the clone allows the charge/discharge device to perform mutual authentication. As a result, such a problem prevents the unauthorized charge/discharge device from being detected.

Hence, PTL 1 discloses a technique to determine whether or not an obtained date and time of a certificate to be used for mutual authentication is found within a permissible value, and check the validity of the certificate. PTLs 2 and 3 disclose techniques to determine the authenticity of a device based on information including the issuing date of a certificate recorded on a disc.

The technique disclosed in PTL 1, however, cannot correctly determine the validity of the certificate in the case where a criterion time—that is used for determining the date when the certificate was obtained is not correct or the data of the criterion time—is tampered with. The techniques disclosed in PTLs 2 and 3 determine the authenticity of a device based on information recorded on a single disc. Thus, in the case where the information recorded on the disc is tampered with, the techniques cannot determine the authenticity of the device.

The above conventional techniques have a problem in that the techniques cannot detect an unauthorized charge/discharge device into which a cryptographic module of an authentic product is introduced in an unauthorized manner, and thus fail to prevent a connection to the unauthorized charge/discharge device.

In order to solve the above problems, an unauthorized connection detecting device according to a first aspect of the present invention detects whether or not a charge/discharge device connected to the unauthorized connection detecting device is an unauthorized charge/discharge device, the charge/discharge device being included in charge/discharge devices for charging or discharging a secondary battery with power. The unauthorized connection detecting device includes: a time information obtaining unit configured to obtain, as time information, information from a first charge/discharge device when the unauthorized connection detecting device is connected to the first charge/discharge device, the information indicating at least one of (i) an issuing date of a first certificate which is a public key certificate held by the first charge/discharge device for authentication and (ii) an issuing date of a certificate revocation list including revoked public key certificates and held by the first charge/discharge device, and the first charge/discharge device being included in the charge/discharge devices; an expiration date obtaining unit configured to obtain expiration date information from a second charge/discharge device when the unauthorized connection detecting device is connected to the second charge/discharge device, the expiration date information indicating an expiration date of a second certificate which is a public key certificate held by the second charge/discharge device for authentication, and the second charge/discharge device being included in the charge/discharge devices; and an unauthorization detecting unit configured to detect whether or not the second charge/discharge device is the unauthorized charge/discharge device by comparing the time information with the expiration date information.

According to the above features, the unauthorized connection detecting device detects whether or not the second charge/discharge device is an unauthorized charge/discharge device by (i) obtaining from the first charge/discharge device time information indicating at least one of an issuing date of a public key certificate (first certificate) and an issuing date of a certificate revocation list, (ii) obtaining from the second charge/discharge device 30 expiration date information for a public key certificate (second certificate), and (iii) comparing the time information with the expiration date information. In other words, the unauthorized connection detecting device determines the validity of the second certificate, by estimating the current time based on the time information indicating at least one of the issuing date of the public key certificate and the issuing date of the certificate revocation list (CRL). Here, the public key certificate and the certificate revocation list are information which has a signature added by the external server 50, and cannot be easily tampered with. Hence, the unauthorized connection detecting device can detect an unauthorized charge/discharge device without obtaining the current time. Even though the current time is tampered with, the unauthorized connection detecting device can detect an unauthorized charge/discharge device, using the time information that is difficult to be tampered with. Such features allow the unauthorized connection detecting device to detect an unauthorized charge/discharge device into which a cryptographic module of an authentic product has been introduced in an unauthorized manner.

In a second aspect of the unauthorized connection detecting device according to the first aspect of the present invention, for example, the time information obtaining unit may obtain from the first charge/discharge device the issuing date of at least one of the first certificate and the certificate revocation list that have been updated, the at least one of the first certificate and the certificate revocation list being obtained from an external server by the first charge/discharge device via a communications network, and the issuing date being obtained as the time information.

Thanks to the features, the unauthorized connection detecting device obtains at least one of the issuing date of the first certificate and the issuing date of the certificate revocation list that have been updated. Here, the first certificate and the certificate revocation list are obtained from the external server by the first charge/discharge device and the issuing data is obtained as the time information. Such a feature allows the unauthorized connection detecting device to detect an unauthorized charge/discharge device, using the issuing date of the latest first certificate or certificate revocation list updated by the external server.

In a third aspect of the unauthorized connection detecting device according to one of the first aspect and the second aspect of the present invention, for example, the time information obtaining unit may compare the issuing date of the first certificate with the issuing date of the certificate revocation list, and obtain as the time information the information indicating a newer issuing date of the issuing dates, and the unauthorization detecting unit may detect that the second charge/discharge device is the unauthorized charge/discharge device in the case where the expiration date indicated in the expiration date information is on or before a time indicated in the time information.

Thanks to the features, the unauthorized connection detecting device obtains, as the time information, the newer issuing date of the issuing date of the first certificate and the issuing date of the certificate revocation list. When the expiration date of the second certificate is on or before the time indicated in the time information, the unauthorized connection detecting device detects that the second charge/discharge device is an unauthorized charge/discharge device. In other words, the unauthorized connection detecting device determines the validity of the second certificate, by estimating that the current time is on or after the time indicated in the time information. Such features allow the unauthorized connection detecting device to detect an unauthorized charge/discharge device.

In a fourth aspect, for example, the unauthorized connection detecting device according to any one of the first aspect to the third aspect of the present invention may further include: a battery history recording unit which records on a memory a charge/discharge history showing a history of charging or discharging the secondary battery by the second charge/discharge device; a charge/discharge threshold determining unit which determines whether or not a charge/discharge sum exceeds a first threshold, the charge/discharge sum being indicated in the charge/discharge history recorded on the memory and representing for the secondary battery a total number of charges, a total number of discharges, a total number of charges and discharges, a total amount of charge, a total amount of discharge, or a total amount of charge and discharge; and a penalty executing unit which executes a penalty operation in the case where a result of the determination shows that the charge/discharge sum exceeds the first threshold, the penalty operation being one of (i) limiting charging or discharging the secondary battery by the second charge/discharge device and (ii) issuing a warning.

Thanks to the above features, in the case of determining that the charge/discharge sum for the secondary battery exceeds the first threshold based on the charge/discharge history of the secondary battery that the second charge/discharge device has charged and discharged, the unauthorized connection detecting device limits charging or discharging the secondary battery by the second charge/discharge device, or issues a warning. Here, when kept connected to the second charge/discharge device, the unauthorized connection detecting device cannot obtain, from another charge/discharge device, time information for determining whether or not the second charge/discharge device is an unauthorized charge/discharge device. Hence, when kept connected to the second charge/discharge device, the unauthorized connection detecting device limits charging or discharging the secondary battery and issues a warning to the user to encourage the user to disconnect the unauthorized connection detecting device from the second charge/discharge device. Such features encourage the user to connect the unauthorized connection detecting device to another charge/discharge device. Consequently, the unauthorized connection detecting device can obtain time information from the other charge/discharge device and determine whether or not the second charge/discharge device is an unauthorized charge/discharge device.

In a fifth aspect of the unauthorized connection detecting device according to the fourth aspect of the present invention, for example, the penalty executing unit may execute the penalty operation at first charging or discharging the secondary battery by the second charge/discharge device after the charge/discharge threshold determining unit determines that the charge/discharge sum exceeds the first threshold.

Thanks to the features, the unauthorized connection detecting device executes a penalty operation at the next charging or discharging after the determination result shows that the charge/discharge sum for the secondary battery exceeds the first threshold. In other words, when the secondary battery is charged or discharged next, the unauthorized connection detecting device encourages the user to connect the unauthorized connection detecting device to another charge/discharge device. Such a feature allows the user to connect the unauthorized connection detecting device to another charge/discharge device. Consequently, the unauthorized connection detecting device can determine whether or not the second charge/discharge device is an unauthorized charge/discharge device.

In a sixth aspect, for example, the unauthorized connection detecting device according to one of the fourth aspect and the fifth aspect of the present invention may further include an alert issuing unit which issues a warning when a difference between the charge/discharge sum and the first threshold goes smaller or equal to a second threshold.

Thanks to the features, the unauthorized connection detecting device issues a warning when a difference between the charge/discharge sum and the first threshold goes smaller or equal to the second threshold. In other words, the unauthorized connection detecting device encourages the user to connect the unauthorized connection detecting device to another charge/discharge device when the charge/discharge sum comes closer to the first threshold. Such a feature allows the user to connect the unauthorized connection detecting device to another charge/discharge device. Consequently, the unauthorized connection detecting device can determine whether or not the second charge/discharge device is an unauthorized charge/discharge device.

In a seventh aspect of the unauthorized connection detecting device according to any one of the fourth aspect to the sixth aspect of the present invention, the charge/discharge threshold determining unit may (i) increase the first threshold when the unauthorized connection detecting device is connected to the first charge/discharge device that is different from the second charge/discharge device and the time information obtaining unit obtains the time information from the first charge/discharge device, and (ii) determine whether or not the charge/discharge sum exceeds the increased first threshold.

Thanks to the features, the unauthorized connection detecting device increases the first threshold when connected to the first charge/discharge device, which is different from the second charge/discharge device, and obtains time information from the first charge/discharge device. In other words, the unauthorized connection detecting device gives the user an incentive to connect the unauthorized connection detecting device to the first charge/discharge device. Such features allow the user to connect the unauthorized connection detecting device to the first charge/discharge device. Consequently, the unauthorized connection detecting device can determine whether or not the second charge/discharge device is an unauthorized charge/discharge device.

In an eighth aspect, for example, the unauthorized connection detecting device according to any one of the first aspect to the seventh aspect of the present invention may further include an unauthorization information notifying unit which notifies an external server of unauthorization information via a third charge/discharge device when the unauthorization detecting unit detects that the second charge/discharge device is the unauthorized charge/discharge device, the unauthorization information being identification information for identifying the second charge/discharge device, and the third charge/discharge device being included in the charge/discharge devices, wherein the unauthorization information notifying unit may determine whether or not a certificate revocation list held by the third charge/discharge device is a latest certificate revocation list, and, in the case where a result of the determination shows that the certificate revocation list held by the third charge/discharge device is the latest certificate revocation list, the unauthorization information notifying unit may determine that the third charge/discharge device is an authorized charge/discharge device and cause the third charge/discharge device to notify the external server of the unauthorization information.

In the case of determining that a certificate revocation list held by the third charge/discharge device is the latest one, the unauthorized connection detecting device determines that the third charge/discharge device is an authorized charge/discharge device and causes the third charge/discharge device to notify the external server of unauthorization information for identifying an unauthorized charge/discharge device. In other words, in the case where a charge/discharge device appropriately updates the certificate revocation list, the unauthorized connection detecting device can determine that the charge/discharge device is an authorized charge/discharge device. Such features allow the unauthorized connection detecting device to notify the external server of the unauthorization information through the authorized charge/discharge device.

In a ninth aspect, for example, the unauthorized connection detecting device according to any one of the first aspect to the seventh aspect of the present invention may further include an unauthorization information notifying unit which, when the unauthorization detecting unit detects that the second charge/discharge device is the unauthorized charge/discharge device, notifies an external server of unauthorization information via a third charge/discharge device included in the charge/discharge devices, the unauthorization information being identification information for identifying the second charge/discharge device, wherein the unauthorization information notifying unit may determine whether or not the number of successful mutual authentications between the unauthorized connection detecting device and the third charge/discharge device is greater than or equal to a third threshold, and in the case where a result of the determination shows that the number of the successful mutual authentications is greater than or equal to the third threshold, the unauthorization information notifying unit may determine that the third charge/discharge device is an authorized charge/discharge device, and cause the third charge/discharge device to notify the external server of the unauthorization information.

Thanks to the above features, the unauthorized connection detecting device performs the following: In the case where the determination result shows that the number of successful mutual authentications between the unauthorized connection detecting device and the charging station is greater than or equal to the third threshold, the unauthorized connection detecting device determines that the third charge/discharge device is an authorized charge/discharge device, and causes the third charge/discharge device to notify the server of the unauthorization information. In other words, in the case where the number of successful mutual authentications between the unauthorized connection detecting device and a charge/discharge device is greater than or equal to a predetermined threshold, the unauthorized connection detecting device can determine that the charge/discharge device is an authorized charge/discharge device. Such features allow the unauthorized connection detecting device to notify the external server of the unauthorization information through the authorized charge/discharge device.

In addition, in order to solve the above problems, an unauthorized connection detecting system according to a tenth aspect of the present invention includes: the unauthorized connection detecting device that detects whether or not a charge/discharge device connected to the unauthorized connection detecting device is an unauthorized charge/discharge device, the charge/discharge device being included in charge/discharge devices for charging or discharging the secondary battery with power; and a server which receives unauthorization information that is identification information for identifying the unauthorized charge/discharge device detected by the unauthorized connection detecting device, wherein the server determines that the second charge/discharge device is the unauthorized charge/discharge device in the case where: the server receives the unauthorization information indicating that the second charge/discharge device is the unauthorized charge/discharge device; and either (i) a public key certificate or a certificate revocation list held by the second charge/discharge device has not been updated unlike an update request indicates, or (ii) the server has received more than once unauthorization information indicating that the second charge/discharge device is the unauthorized charge/discharge device.

Thanks to the features, the unauthorized connection detecting system includes the unauthorized connection detecting device and the server that receives unauthorization information. The server determines that the second charge/discharge device is an unauthorized charge/discharge device in one of the cases where (i) either the public key certificate or the certificate revocation list held by the second charge/discharge device is not updated unlike the update request indicates, and (ii) the server has received more than once the unauthorization information indicating that the second charge/discharge device is an unauthorized charge/discharge device. In the unauthorized connection detecting system 1, such features allow the server to determine, after the reception of the unauthorization information, whether or not the charge/discharge device indicated in the received unauthorization information is an unauthorized charge/discharge device.

It is noted that the present invention can be implemented not only in the form of the unauthorized connection detecting device or the unauthorized connection detecting system but also in the form of an unauthorized connection detecting method including characteristic processing carried out by the unauthorized connection detecting device or the unauthorized connection detecting system as steps. Moreover, the steps included in the unauthorized connection detecting method may be implemented in the form of a program to be executed by a computer and a computer-readable recording medium, such as a CD-ROM, in which the program is stored. As a matter of course, the program may be distributed via a recording medium such as a CD-ROM and a transmission medium such as the Internet. In addition, the present invention may be implemented in the form of an integrated circuit having characteristic processing units included in the unauthorized connection detecting device.

Described hereinafter in detail is an embodiment of the present invention with reference to the drawings. It is noted that the embodiment below is a specific example of the present invention. The numerical values, constituent elements, arrangement positions and connecting schemes of the constituent elements, steps, and an order of steps all described in the embodiment are examples, and shall not be defined as they are. Hence, among the constituent elements in the embodiment, those not described in an independent claim representing the most generic concept of the present invention are introduced to implement a preferable form of the present invention.

FIG. 1 shows a structure of an unauthorized connection detecting system 1 according to an embodiment of the present invention.

As shown in FIG. 1, the unauthorized connection detecting system 1 includes a power storage device 10, a first charge/discharge device 20, a second charge/discharge device 30, a charging station 40, and a server 50.

The power storage device 10 is connected to a charge/discharge device, such as the first charge/discharge device 20, the second charge/discharge device 30, or the charging station 40. The power storage device 10 receives power from and discharges power to the charge/discharge device. In the embodiment, the power storage device 10 is an electric vehicle including a secondary battery such as a lithium-ion secondary battery; however, the power storage device 10 shall not be limited to an electric vehicle.

When connected to the charging station 40, the power storage device 10 is connected to the server 50 via the charging station 40 and a communications network 60. Hence, the power storage device 10 can transmit and receive information to and from the server 50. The power storage device 10 shall be described later in detail.

The first charge/discharge device 20 is connected with the power storage device 10 and charges or discharges with power a secondary battery included in the power storage device 10. Here, the first charge/discharge device 20 is an authentic one.

Moreover, the first charge/discharge device 20 is connected to a switching circuit 22 in a house 21. The first charge/discharge device 20 can receive power from a commercial power system and supply power to a load used in the house 21. The first charge/discharge device 20 can also supply power to the commercial power system. Furthermore, the first charge/discharge device 20 is connected to the server 50 via the house 21 and the communications network 60, and can transmit and receive information to and from the server 50.

As the first charge/discharge device 20 is so, the second charge/discharge device 30 is connected with the power storage device 10 and charges or discharges with power the secondary battery included in the power storage device 10.

The second charge/discharge device 30 may be connected to the switching circuit in the house, as the first charge/discharge device 20 is so. The second charge/discharge device 30 does not have to be connected to the switching circuit.

The charging station 40 is a facility to charge the power storage device 10 with power. The charging station 40 may receive power from the power storage device 10. The charging station 40 is connected to the server 50 via the communications network 60, and can transmit and receive information to and from the server 50.

Through the communications network 60, the server 50 is connected to a charge/discharge device including the first charge/discharge device 20 and the charging station 40. The server 50 transmits to the charge/discharge device information such as a public key certificate and a certificate revocation list, and receives from the charge/discharge device unauthorization information indicating an unauthorized charge/discharge device. For example, the server 50 is a certificate authority which periodically distributes the public key certificate and the certificate revocation list.

Described next are details of the power storage device 10 including an unauthorized connection detecting device 100.

Figure 2:
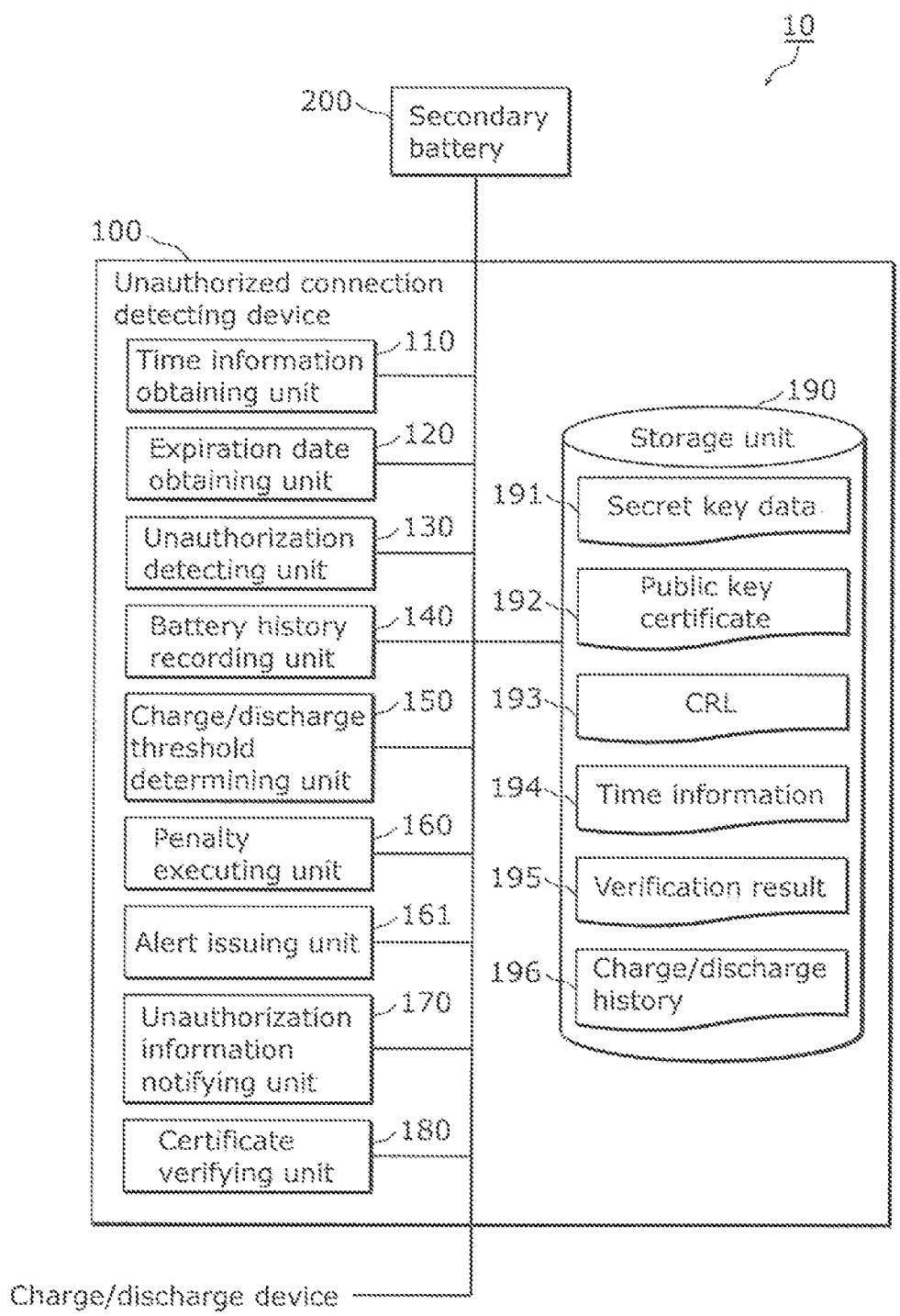
FIG. 2 depicts a block diagram showing a functional structure of a power storage device including the unauthorized connection detecting device according to the embodiment of the present invention.

FIG. 2 depicts a block diagram showing a functional structure of the power storage device 10 including the unauthorized connection detecting device 100 according to the embodiment of the present invention.

As shown in FIG. 2, the power storage device 10 includes a secondary battery 200 and the unauthorized connection detecting device 100. The secondary battery 200 is a lithium-ion secondary battery to be charged and discharged. The unauthorized connection detecting device 100 detects whether or not a charge/discharge device connected thereto is an unauthorized one. The unauthorized connection detecting device 100 may be either a general-purpose personal computer or a computer dedicated to detection of the unauthorized charge/discharge device.

The unauthorized connection detecting device 100 includes a time information obtaining unit 110, an expiration date obtaining unit 120, an unauthorization detecting unit 130, a battery history recording unit 140, a charge/discharge threshold determining unit 150, a penalty executing unit 160, an alert issuing unit 161, an unauthorization information notifying unit 170, a certificate verifying unit 180, and a storage unit 190. The storage unit 190 stores secret key data 191, a public key certificate 192, a CRL 193, time information 194, a verification result 195, and a charge/discharge history 196.

When the unauthorized connection detecting device 100 is connected to the first charge/discharge device 20, the time information obtaining unit 110 obtains time information from the first charge/discharge device 20. Here, the time information indicates at least one of (i) an issuing date of a first certificate which is a public key certificate held by the first charge/discharge device 20 for authentication and (ii) an issuing date of a certificate revocation list held by the first charge/discharge device 20. The certificate revocation list, which is a list of revoked public key certificates, makes it possible to identify an unauthorized charge/discharge device corresponding to a revoked public key certificate.

Specifically, the time information obtaining unit 110 obtains from the first charge/discharge device 20 at least one of the issuing date of the first certificate and the issuing date of the certificate revocation list that have been updated. Here, the at least one of the first certificate and the certificate revocation list is obtained from the external server 50 by the first charge/discharge device 20 via the communications network 60, and the issuing date is obtained as the time information. Moreover, the time information obtaining unit 110 compares the issuing date of the first certificate with the issuing date of the certificate revocation list, and obtains, as the time information, information indicating the newer issuing date of the issuing dates.

The time information obtaining unit 110 then updates the time information 194 by storing the obtained time information in the time information 194 included in the storage unit 190. The time information may be indicated in one of a year-month-day format, a year-month format, and a day-time format.

When connected to the first charge/discharge device 20, the unauthorized connection detecting device 100 updates the CRL 193 by obtaining a CRL from the first charge/discharge device 20 and storing the obtained CRL in the CRL 193 included in the storage unit 190. Hence, the time information obtaining unit 110 can obtain the time information upon obtaining the issuing date of the latest certificate revocation list from the CRL 193 stored in the storage unit 190.

When the unauthorized connection detecting device 100 is connected to the second charge/discharge device 30, the expiration date obtaining unit 120 obtains expiration date information from the second charge/discharge device 30. Here, the expiration date information indicates an expiration date of a second certificate which is a public key certificate held by the second charge/discharge device 30 for authentication.

The unauthorization detecting unit 130 detects whether or not the second charge/discharge device 30 is an unauthorized charge/discharge device by comparing the time information obtained by the time information obtaining unit 110 with the expiration date information obtained by the expiration date obtaining unit 120. Specifically, in the case where the expiration date indicated in the expiration date information is on or before the time indicated in the time information, the unauthorization detecting unit 130 detects that the second charge/discharge device 30 is an unauthorized charge/discharge device.

The unauthorization detecting unit 130 then updates the verification result 195 by storing the verification result in the verification result 195.

FIG. 3A shows an example of the verification result 195 according to the embodiment of the present invention.

As shown in FIG. 3A, the verification result 195 is a group of data items including a second certificate ID and a verification result. The second certificate ID is ID information for identifying a second certificate which is a public key certificate for the second charge/discharge device 30. The verification result is information indicating whether or not the second certificate identified with the second certificate ID is an unauthorized public key certificate.

In other words, when detecting that the second charge/discharge device 30 is an unauthorized charge/discharge device, the unauthorization detecting unit 130 stores in the verification result 195 (i) the second certificate ID indicating the ID information for the public key certificate held by the second charge/discharge device 30 and (ii) the verification result "NG". When detecting that the second charge/discharge device 30 is not an unauthorized charge/discharge device, the unauthorization detecting unit 130 stores in the verification result 195 (i) the second certificate ID indicating the ID information for the public key certificate held by the second charge/discharge device 30 and (ii) the verification result "OK".

Back to FIG. 2, the battery history recording unit 140 records on a memory the charge/discharge history showing a history of charging or discharging the secondary battery 200 by the second charge/discharge device 30. Specifically, the battery history recording unit 140 updates the charge/discharge history 196 by recording the charge/discharge history on the charge/discharge history 196 included in the storage unit 190.

Here, the battery history recording unit 140 estimates the date and time when the second charge/discharge device 30 charged or discharged the secondary battery 200 based on the time information obtained by the time information obtaining unit 110. The battery history recording unit 140 then records the charge/discharge history on the charge/discharge history 196 in association with the estimated date and time.

Specifically, the battery history recording unit 140 counts how much time has elapsed since the time (the issuing date of the first certificate or the certificate revocation list) indicated in the time information obtained by the time information obtaining unit 110. The battery history recording unit 140 then estimates the current date and time.

Moreover, when the issuing date of the first certificate or the certificate revocation list was updated and the time information obtaining unit 110 obtained new time information, the battery history recording unit 140 compares the time indicated the new time information with the estimated current date and time, and checks for contradiction. This is because the battery history recording unit 140 might have counted the elapsing time wrong when estimating the current date and time. For example, in the case where the estimated current date and time is before the time indicated in the updated time information, the battery history recording unit 140 determines that there is a contradiction and corrects the estimated current date and time.

In addition, when the server 50 issues the first certificate of the unauthorized connection detecting device 100, the time information obtaining unit 110 can obtain accurate time information from the server 50 via the first charge/discharge device 20. Hence, the battery history recording unit 140 can estimate the current date and time using the accurate time information.

FIG. 3B exemplifies the charge/discharge history 196 according to the embodiment of the present invention.

As shown in FIG. 3B, the charge/discharge history 196 is a group of data items including a date and time, a second certificate ID, the number of charges and discharges, and an amount of charge and discharge.

The date and time, which indicates when an event occurred, is identified with the current date and time estimated by the battery history recording unit 140 as described above. The number of charges and discharges indicates the total number of charges or discharges on the date and time. The amount of charge and discharge indicates an amount of charge or an amount of discharge by the charge/discharge device on the date and time. The second certificate ID is ID information for identifying the second certificate which is a public key certificate for the second charge/discharge device 30 connected to charge or discharge the power storage device 10.

Specifically, in the number of charges and discharges, the number of charges is indicated with a plus (+) sign, and the number of discharges is indicated with a minus (−) sign. Such features make it possible to distinguish between the number of charges and the number of discharges. In the amount charge and discharge, the amount of charge is indicated with a plus (+) sign, and the amount of discharge is indicated with a minus (−) sign. Such features make it possible to distinguish between the amount of charge and the amount of discharge.

It is noted that the amount charge and discharge may be data for calculating a charge and discharge amount such as a voltage, a current, and a resistance. The charge/discharge history 196 may include data other than the above data. For example, the charge/discharge history 196 may include parameters especially for batteries such as state of charge (SOC), state of health (SOH), full charge lasting time, and time and frequency of over discharge, and parameters for electric vehicles such as total time of use, age of service, and a total mirage (total amount of used power). The charge/discharge history 196 may have the above data compressed and encrypted.

Back to FIG. 2, the charge/discharge threshold determining unit 150 determines whether or not a charge/discharge sum exceeds a first threshold. Here, the charge/discharge sum is indicated in the charge/discharge history 196 stored in the storage unit 190, and representing for the secondary battery 200 the total number of charges, the total number of discharges, the total number of charges and discharges, the total amount of charge, the total amount of discharge, or the total amount of charge and discharge. It is noted that the charge/discharge sum includes the following: the total number of charges, the total number of discharges, the total number of charges and discharges, the total amount of charge, the total amount of discharge, or the sum of the absolute values of a charge amount and a discharge amount. In addition, the value of the first threshold shall not be limited in particular. Any given value may be set to the first threshold by the user.

The charge/discharge threshold determining unit 150 (i) increases the first threshold when the charge/discharge threshold determining unit 150 is connected to the first charge/discharge device 20 that is different from the second charge/discharge 30 and the time information obtaining unit 110 obtains the time information from the first charge/discharge device 20, and (ii) determines whether or not the charge/discharge sum exceeds the increased first threshold.

The penalty executing unit 160 executes a penalty operation in the case where the charge/discharge threshold determining unit 150 determines that the charge/discharge sum exceeds the first threshold. The penalty operation includes limiting charging or discharging the secondary battery 200 by the second charge/discharge device 30 or issuing a warning to the user. For example, the penalty executing unit 160 executes the penalty operation at the next charging or discharging the secondary battery 200 by the second charge/discharge device 30 after the determination result shows that the charge/discharge sum exceeds the first threshold.

The alert issuing unit 161 issues a warning when a difference between the charge/discharge sum and the first threshold goes smaller or equal to a second threshold. In other words, the alert issuing unit 161 issues the warning when the charge/discharge sum comes closer to the first threshold. It is noted that the second threshold is preferably smaller than the first threshold; however, the second threshold shall not be defined as it is in particular. Any given value may be set to the second threshold by the user.

When the unauthorization detecting unit 130 detects that the second charge/discharge device 30 is an unauthorized device, the unauthorization information notifying unit 170 notifies the external server 50 of unauthorization information via a third charge/discharge device. Here, the unauthorization information is identification information for identifying the second charge/discharge device 30. Specifically, the unauthorization information notifying unit 170 determines whether or not a certificate revocation list held by the third charge/discharge device is the latest certificate revocation list. In the case where the determination result shows that the certificate revocation list held by the third charge/discharge device is the latest certificate revocation list, the unauthorization information notifying unit 170 determines that the third charge/discharge device is an authorized charge/discharge device and causes the third charge/discharge device to notify the server 50 of the unauthorization information. The third charge/discharge device here is the charging station 40, for example.

The certificate verifying unit 180 executes mutual authentication between the certificate verifying unit 180 itself and a charge/discharge device when the charge/discharge device is connected with the unauthorized connection detecting device 100. Specifically, the certificate verifying unit 180 executes the mutual authentication, using the secret key data 191 and the public key certificate 192 stored in the storage unit 190. The details of the mutual authentication executed by the certificate verifying unit 180 shall be described later.

Described next is how unauthorized connection detecting device 100 detects an authorized charge/discharge device.

Figure 5:
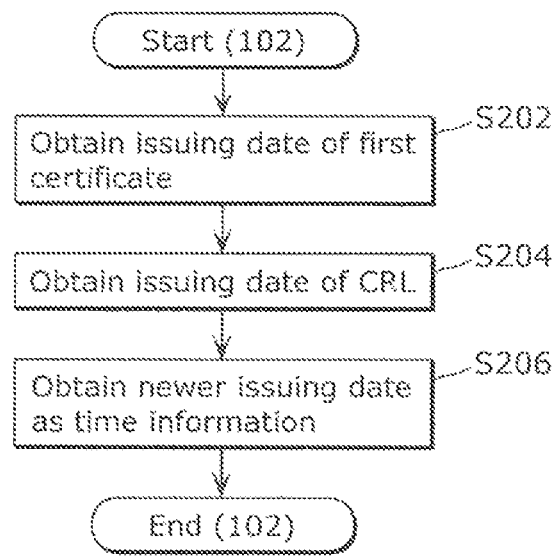
FIG. 5 depicts a flowchart exemplifying how a time information obtaining unit according to the embodiment of the present invention obtains time information.
Figure 6:
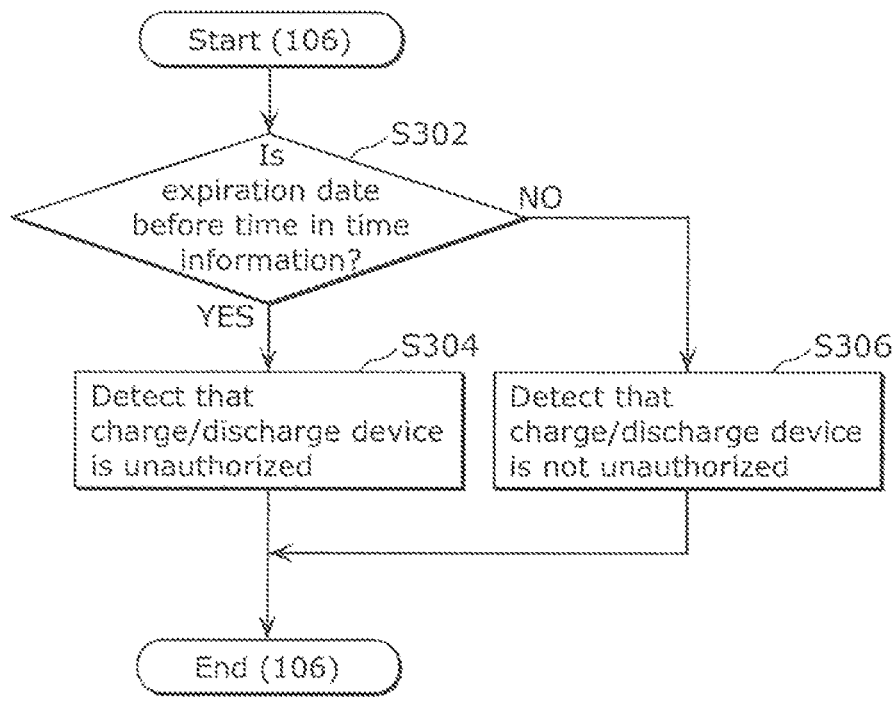
FIG. 6 depicts a flowchart exemplifying how an unauthorization detecting unit according to the embodiment of the present invention detects an unauthorized charge/discharge device.
Figure 7:
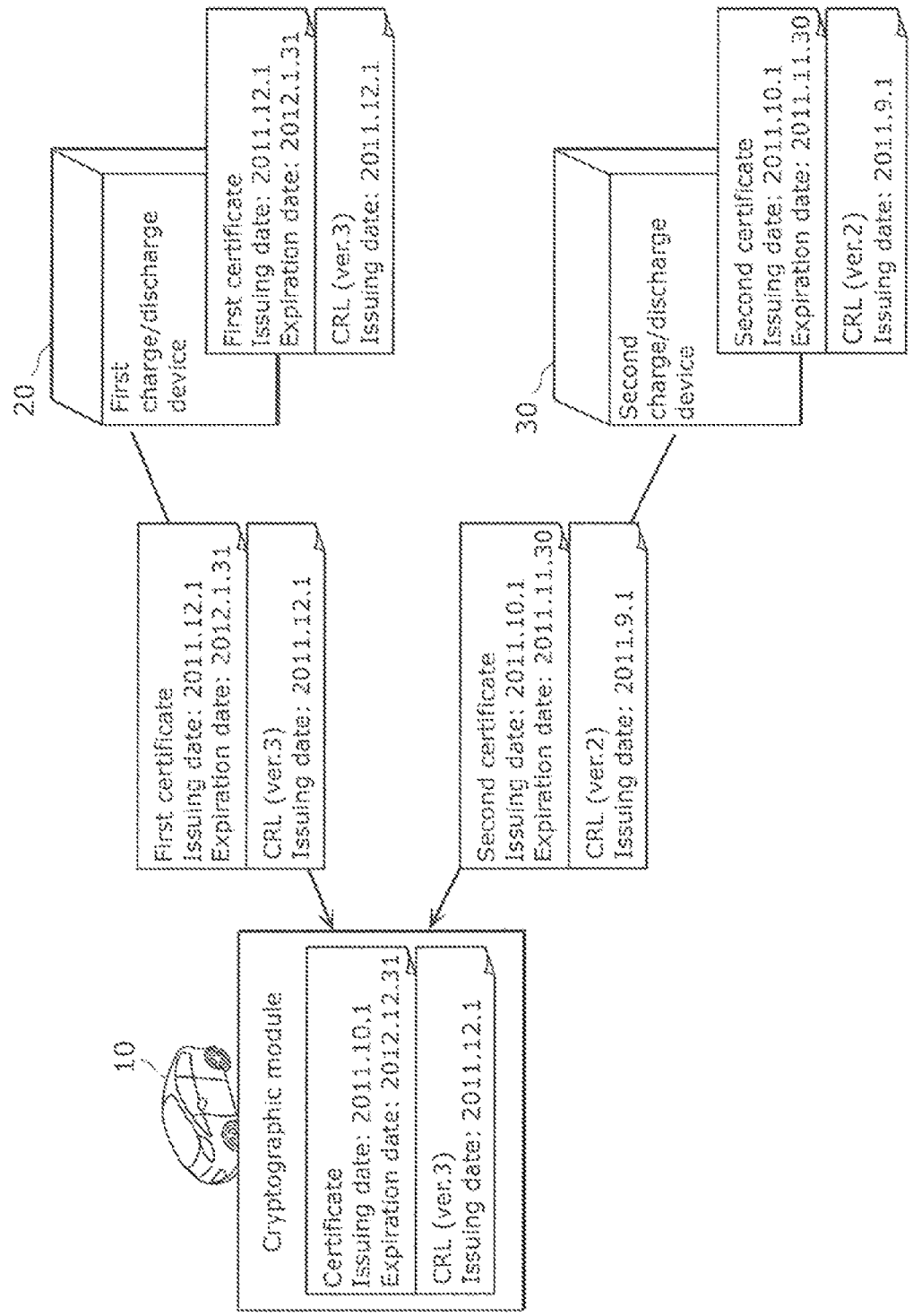
FIG. 7 shows how the unauthorized connection detecting device according to the embodiment of the present invention detects an unauthorized charge/discharge device.

FIGS. 4 to 6 depict flowcharts exemplifying how the unauthorized connection detecting device 100 according to the embodiment of the present invention detects an unauthorized charge/discharge device. FIG. 7 shows how the unauthorized connection detecting device 100 according to the embodiment of the present invention detects an unauthorized charge/discharge device.

When the unauthorized connection detecting device is 100 connected to the first charge/discharge device 20, as shown in FIG. 4, the time information obtaining unit 110 obtains time information from the first charge/discharge device 20 (S102). As shown in FIG. 7, for example, the time information obtaining unit 110 obtains "2011.12.1" as the time information from the first charge/discharge device 20. How the time information obtaining unit 110 obtains the time information shall be described later in detail.

When the unauthorized connection detecting device 100 is connected to the second charge/discharge device 30, the expiration date obtaining unit 120 obtains expiration date information from the second charge/discharge device 30 (S104). Here, the expiration date information indicates the expiration date of a second certificate which is a public key certificate held by the second charge/discharge device 30 for authentication. As shown in FIG. 7, for example, the expiration date obtaining unit 120 obtains "2011.11.30" as the expiration date information for the second certificate from the second charge/discharge device 30.

Then back to FIG. 4, the unauthorization detecting unit 130 detects whether or not the second charge/discharge device 30 is an unauthorized charge/discharge device, by comparing the time information obtained by the time information obtaining unit 110 with the expiration date information obtained by the expiration date obtaining unit 120 (S106). How the unauthorization detecting unit detects an unauthorized charge/discharge device shall be described later in detail.

This is how the unauthorized connection detecting device 100 detects an authorized charge/discharge device.

Described next in detail is how the time information obtaining unit 110 obtains the time information (S102 in FIG. 4). FIG. 5 depicts a flowchart exemplifying how the time information obtaining unit 110 according to the embodiment of the present invention obtains time information.

As shown in FIG. 5, the time information obtaining unit 110 obtains the issuing date of the first certificate—that is a public key certificate held by the first charge/discharge device 20 for authentication (S202). As shown in FIG. 7, for example, the time information obtaining unit 110 obtains, as the time information, "2011.12.1"—that is the issuing date of the first certificate—from the first charge/discharge device 20.

It is noted that the first certificate has been updated and is obtained from the server 50 by the first charge/discharge device 20. In addition, the first certificate is set to expire early.

In FIG. 7, for example, a certificate held by the unauthorized connection detecting device 100 expires in one year and three months after the issuing date. In contrast, the first certificate expires in two months after the issuing date. The first certificate expires significantly earlier than the certificate for the unauthorized connection detecting device 100.

Back to FIG. 5, the time information obtaining unit 110 obtains the issuing date of a certificate revocation list (CRL) held by the first charge/discharge device 20 and used for identifying an unauthorized charge/discharge device (S204). As shown in FIG. 7, for example, the time information obtaining unit 110 obtains, as the time information, "2011.12.1"—that is the issuing date of the CRL (ver. 3)—from the first charge/discharge device 20. It is noted that the CRL has been updated and is obtained from the server 50 by the first charge/discharge device 20.

Back to FIG. 5, the time information obtaining unit 110 compares the issuing date of the first certificate with the issuing date of the certificate revocation list, and obtains, as the time information, information indicating the newer issuing date of the issuing dates (S206). As shown in FIG. 7, for example, the time information obtaining unit 110 obtains "2011.12.1" as the time information from the time information obtaining unit 110. The time information obtaining unit 110 stores the obtained time information in the time information 194 included in the storage unit 190.

This is how the time information obtaining unit 110 obtains time information (S102 in FIG. 4).

Described next in detail is how the unauthorization detecting unit 130 detects an unauthorized charge/discharge device (S106 in FIG. 4). FIG. 6 depicts a flowchart exemplifying how the unauthorization detecting unit 130 according to the embodiment of the present invention detects an unauthorized charge/discharge device.

As shown in FIG. 5, the unauthorization detecting unit 130 detects whether or not the expiration date indicated in the expiration date information obtained by the expiration date obtaining unit 120 is on or before the time indicated in the time information obtained by the time information obtaining unit 110 (S302).

In the case where the determination result shows that the expiration date is on or before the time (S302: YES), the unauthorization detecting unit 130 detects that the second charge/discharge device 30 is an unauthorized charge/discharge device (S304). In the case where the determination result shows that the expiration date is not before the time (S302: NO), the unauthorization detecting unit 130 detects that the second charge/discharge device 30 is not an unauthorized charge/discharge device (S306).

As shown in FIG. 7, for example, the expiration date of the second certificate is "2011.11.30" and the time is "2011.12.1". Hence, the unauthorization detecting unit 130 determines the expiration date is before the time, and detects that the second charge/discharge device 30 is an unauthorized charge/discharge device. The unauthorization detecting unit 130 then stores the verification result in the verification result 195 included in the storage unit 190.

It is noted that the second certificate is set to expire early. For example, a certificate held by the unauthorized connection detecting device 100 expires in one year and three months after the issuing date. In contrast, the second certificate expires in two months after the issuing date. The second certificate expires significantly earlier than the certificate for the unauthorized connection detecting device 100.

In other words, the cryptographic module of an authentic product is set to expire early. Even though a cloned cryptographic module of the authentic product is introduced in the second charge/discharge device 30 in an unauthorized manner, tampering with the expiration date of the cryptographic module is difficult. Hence, the second certificate is set to expire early.

When the second certificate is set to expire earlier, the unauthorization detecting unit 130 can detect more accurately whether or not the second charge/discharge device 30 is an unauthorized charge/discharge device.

That is how the unauthorization detecting unit 130 detects an unauthorized charge/discharge device (S106 in FIG. 4).

Described next is how the unauthorized connection detecting device 100 executes a penalty operation to encourage the user to connect the power storage device 10 to the first charge/discharge device 20.

Figure 8:
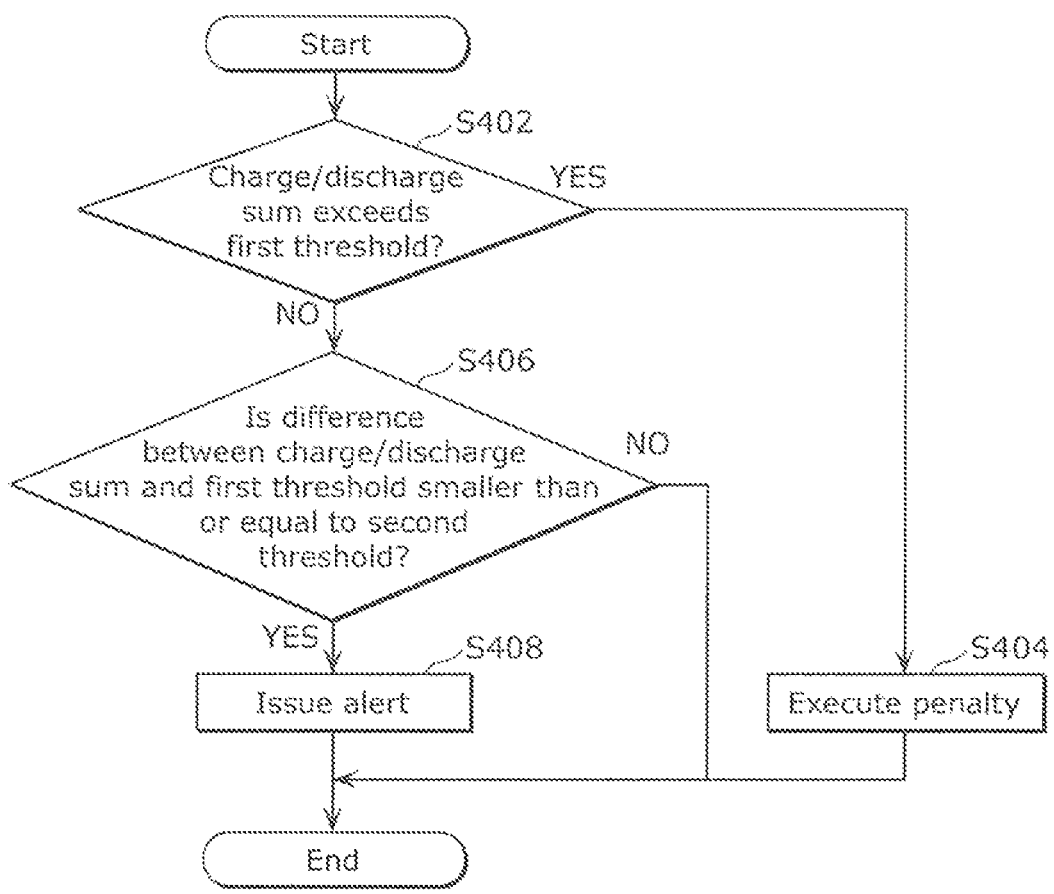
FIG. 8 depicts a flowchart exemplifying how the unauthorized connection detecting device according to the embodiment of the present invention performs a penalty operation to encourage a user to connect a power storage device to a first charge/discharge device.

FIG. 8 depicts a flowchart exemplifying how the unauthorized connection detecting device 100 according to the embodiment of the present invention performs a penalty operation to encourage the user to connect the power storage device 10 to the first charge/discharge device 20.

As shown in FIG. 8, the charge/discharge threshold determining unit 150 determines whether or not the charge/discharge sum exceeds the first threshold with reference to the charge/discharge history 196 stored in the storage unit 190 (S402). Here, the charge/discharge history 196 is updated by the battery history recording unit 140 for each time the second charge/discharge device 30 charges and discharge the secondary battery 200.

In the case where the charge/discharge threshold determining unit 150 determines that the charge/discharge sum exceeds the first threshold (S402: YES), the penalty executing unit 160 executes a penalty operation including limiting charging or discharging the secondary battery 200 by the second charge/discharge device 30 or issuing a warning to the user (S404).

Specifically, as a penalty operation, the penalty executing unit prohibits the second charge/discharge device 30 from charging and discharging the secondary battery 200, limits the amount of power with which the second charge/discharge device 30 charges, limits discharge power from the second charge/discharge device 30, and keeps an alert ringing. In the case where the second charge/discharge device 30 is loaded into an electric vehicle, the penalty executing unit 160 allows the electric vehicle only to run at a low speed and turns off the air conditioner and the audio system of the electric vehicle.

The penalty executing unit 160 may execute the penalty operation (i) as soon as the charge/discharge sum exceeds the first threshold or (ii) at the first charging or discharging the secondary battery 200 by the second charge/discharge device 30 after the charge/discharge threshold determining unit 150 determines that the charge/discharge sum exceeds the first threshold. It is noted that in the case where the second charge/discharge device 30 is loaded into an electric vehicle, it is dangerous to execute the penalty operation while the electric vehicle is running. Hence, the penalty executing unit 160 may cancel the penalty operation while the electric vehicle is running.

In the case where the charge/discharge threshold determining unit 150 determines that the charge/discharge sum does not exceed the first threshold (S402: NO), the alert issuing unit 161 determines whether or not the difference between the charge/discharge sum and the first threshold is smaller or equal to the second threshold (S406). In the case where the determination result shows that the difference between the charge/discharge sum and the first threshold goes smaller or equal to the second threshold (S406: YES), the alert issuing unit 161 issues a warning (S408).

In the case where the determination result shows that the difference between the charge/discharge sum and the first threshold is above the second threshold (S406: NO), the alert issuing unit 161 ends processing without executing a penalty operation or issuing an alert.

When the above penalty operation encourage the user to connect the unauthorized connection detecting device 100 to the first charge/discharge device 20 and the time information obtaining unit obtains the time information from the first charge/discharge device 20, the charge/discharge threshold determining unit 150 may increase the first threshold. Here, the charge/discharge threshold determining unit 150 determines whether or not the charge/discharge sum exceeds the increased first threshold (S402), and the penalty executing unit 160 and the alert issuing unit 161 repeats the subsequent processing.

That is how the unauthorized connection detecting device 100 executes a penalty operation to encourage the user to connect the power storage device 10 to the first charge/discharge device 20.

Described next is how unauthorized connection detecting device 100 notifies the server 50 of an authorized charge/discharge device.

Figure 9:
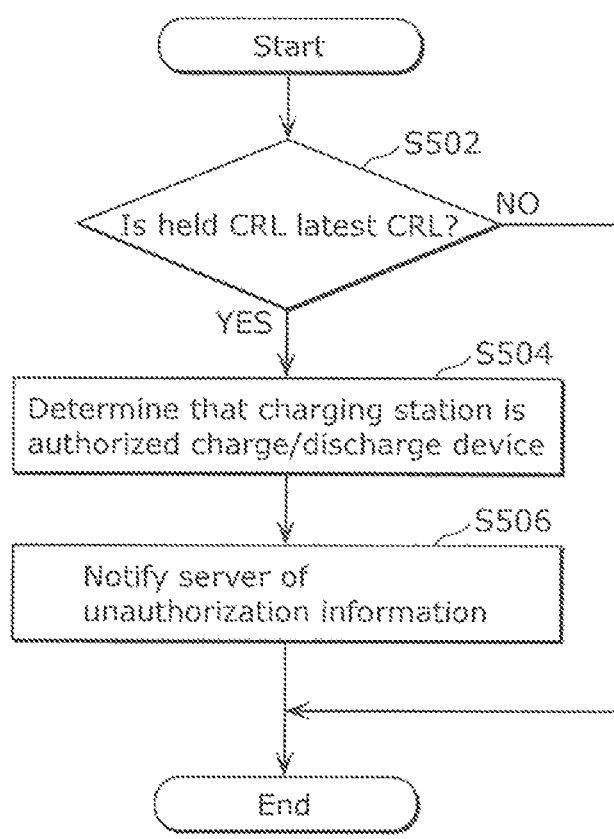
FIG. 9 depicts a flowchart exemplifying how the unauthorized connection detecting device according to the embodiment of the present invention notifies a server of an unauthorized charge/discharge device.

FIG. 9 depicts a flowchart exemplifying how the unauthorized connection detecting device 100 according to the embodiment of the present invention notifies the server 50 of an unauthorized charge/discharge device. FIG. 7 shows how the unauthorized connection detecting device 100 according to the embodiment of the present invention notifies the server 50 of the unauthorized charge/discharge device.

As shown in FIG. 9, when the unauthorization detecting unit detects that the second charge/discharge device 30 is an unauthorized charge/discharge device, the unauthorization information notifying unit 170 determines whether or not a certificate revocation list held by the charging station 40 working as the third charge/discharge device is the latest certificate revocation list (S502).

Figure 10:
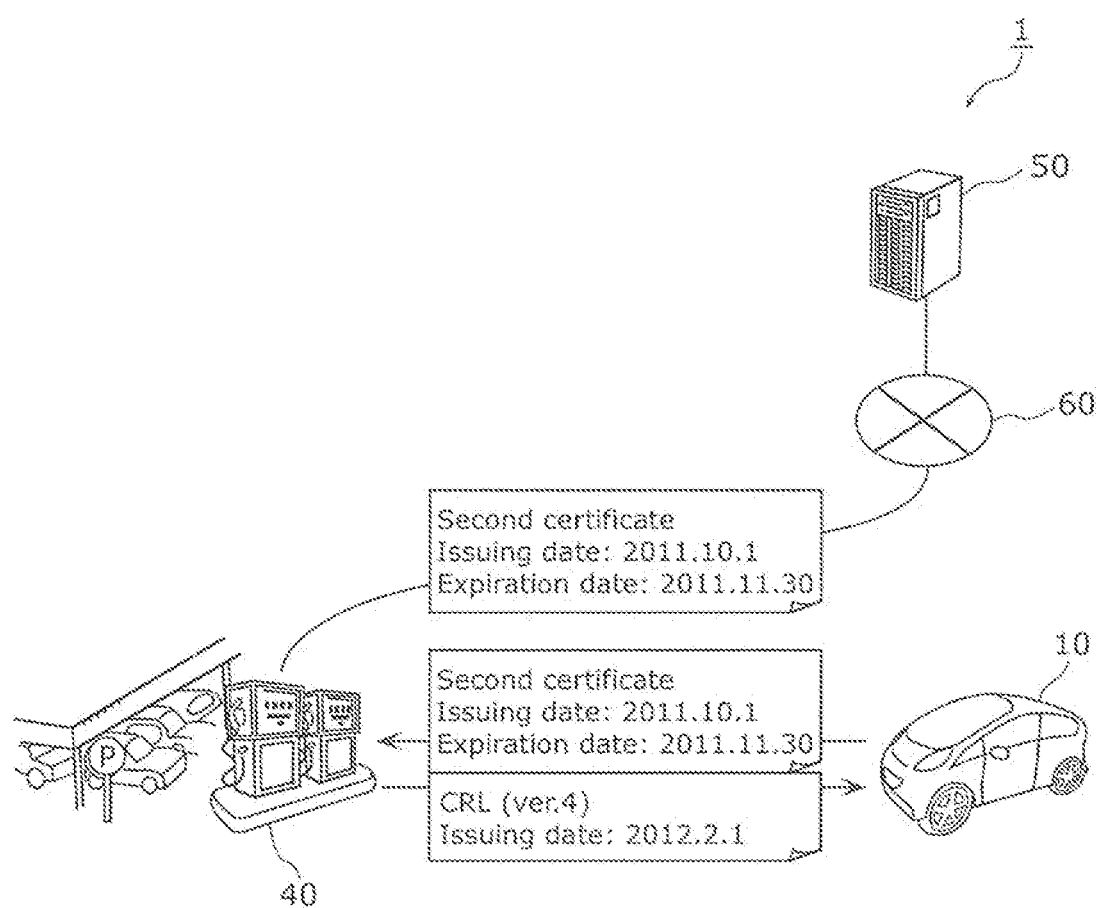
FIG. 10 shows how the unauthorized connection detecting device according to the embodiment of the present invention notifies the server of the unauthorized charge/discharge device.

In the case where the determination result shows that the charging station 40 holds the latest certificate revocation list (S502: YES), the unauthorization information notifying unit 170 determines that the charging station 40 is an authorized charge/discharge device (S504). As shown in FIG. 10, for example, the unauthorization information notifying unit 170 determines that the charging station 40 holds the latest CRL in the case where the unauthorization information notifying unit 170 obtains the CRL (ver. 4) from the charging station 40 when the unauthorization information notifying unit 170 holds the CRL (ver. 3). Here, the unauthorization information notifying unit 170 determines that the charging station 40 is an authorized charge/discharge device.

Back to FIG. 9, the unauthorization information notifying unit 170 causes the charging station 40 to notify the server 50 of unauthorization information which is identification information for identifying the second charge/discharge device 30 (S506). As shown in FIG. 10, for example, the unauthorization information notifying unit 170 causes the charging station 40 to transmit, through the communications network 60, the second certificate of the second charge/discharge device 30 as the unauthorization information.

Hence, the server 50 can receive the unauthorization information. It is noted that the unauthorization information shall not be limited to the second certificate. Any given information may be the unauthorization information as far as the information can identify an unauthorized charge/discharge device, such as the ID information for an unauthorized charge/discharge device.

That is how the unauthorized connection detecting device 100 notifies the server 50 of an authorized charge/discharge device.

Described next is how the server 50 receives the unauthorization information and executes processing upon receiving the unauthorization information.

Figure 11A:
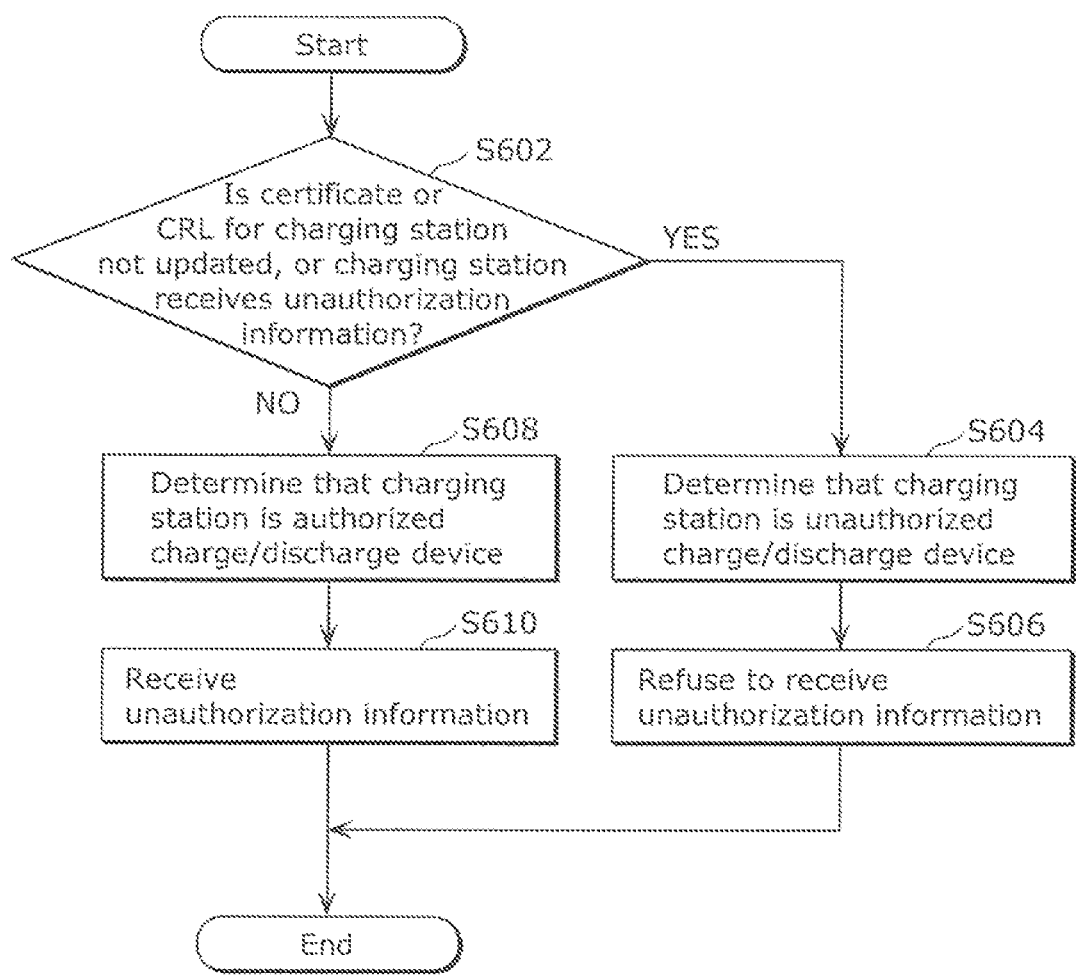
FIG. 11A depicts a flowchart exemplifying how the server according to the embodiment of the present invention receives unauthorization information.

FIG. 11A depicts a flowchart exemplifying how the server 50 according to the embodiment of the present invention receives the unauthorization information.

As shown in FIG. 11A, the server 50 determines either (i) whether or not the public key certificate or the certificate revocation list, held by the charging station 40 acting as a third charge/discharge device, has been updated according to an update request or (ii) whether or not the server 50 has received the unauthorization information indicating that the charging station 40 is an unauthorized charge/discharge device (S602). Here, the update request is processing by the server 50 transmitting an authorized public key certificate or a certificate revocation list to the charging station 40 and requesting the charging station 40 to update the public key certificate or the certificate revocation list held by the charging station 40.

In the case where the determination result shows either (i) the public key certificate or the certificate revocation list of the charging station 40 has not been updated unlike the update request indicates or (ii) the server 50 has received the unauthorization information indicating that the charging station 40 is an unauthorized charge/discharge device (S602: YES), the server 50 determines that the charging station 40 is an unauthorized charge/discharge device (S604).

Here, the server 50 refuses to receive the unauthorization information from the unauthorized connection detecting device 100 through the charging station 40 (S606).

In the case where the determination result shows either (i) the public key certificate or the certificate revocation list of the charging station 40 has been updated according to the update request or (ii) the charging station 40 has not received the unauthorization information indicating that the charging station 40 is an unauthorized charge/discharge device (S602: NO), the server 50 determines that the charging station 40 is an authorized charge/discharge device (S608).

Here, the server 50 receives the unauthorization information from the unauthorized connection detecting device 100 through the charging station 40 (S610).

Figure 11B:
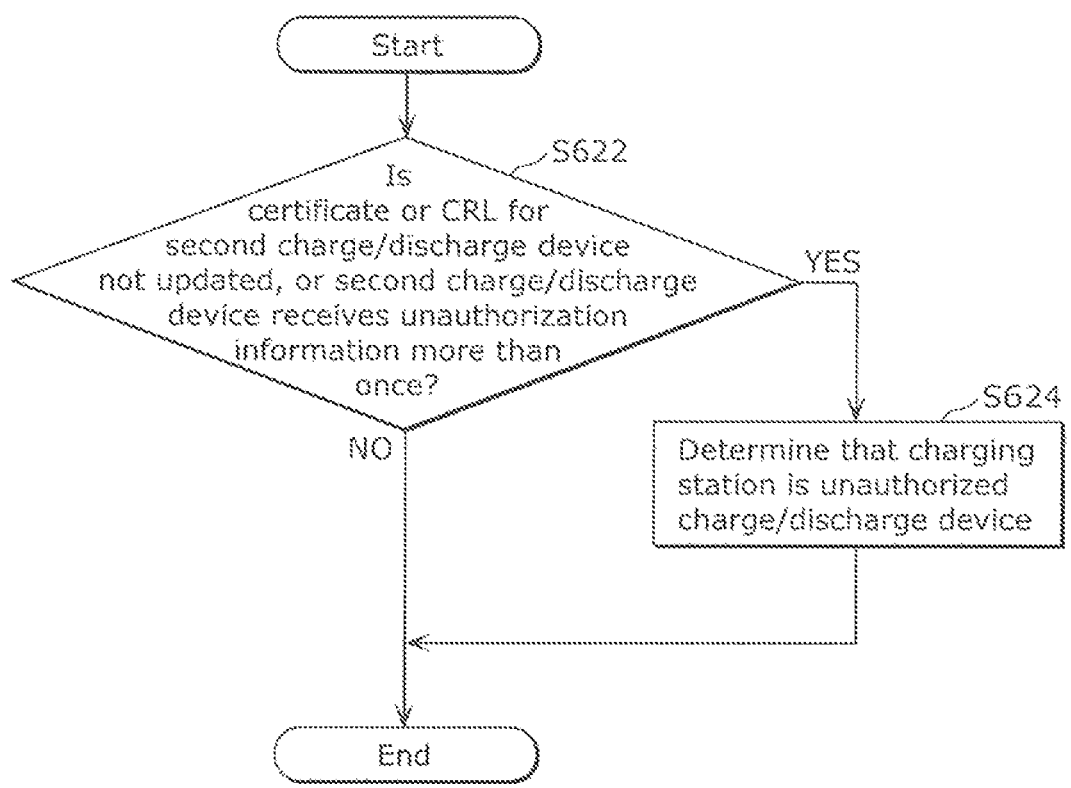
FIG. 11B depicts a flowchart exemplifying how the server according to embodiment of the present invention executes processing upon receiving the unauthorization information.

FIG. 11B depicts a flowchart exemplifying how the server 50 according to embodiment of the present invention executes processing upon receiving the unauthorization information.

The server 50 receives, from the unauthorized connection detecting device 100 through the charging station 40, unauthorization information indicating that the second charge/discharge device 30 is an unauthorized charge/discharge device.

The server 50 then determines either (i) whether or not the public key certificate or the certificate revocation list held by the second charge/discharge device 30 has been updated according to an update request or (ii) whether or not the server 50 has received more than once unauthorization information indicating that the second charge/discharge device 30 is an unauthorized charge/discharge device (S622).

Here, the update request is processing by the server 50 transmitting an authorized public key certificate or a certificate revocation list to the second charge/discharge device 30 and requesting the second charge/discharge device 30 to update the public key certificate or the certificate revocation list held by the second charge/discharge device 30. When the server 50 receives more than once the unauthorization information indicating that the second charge/discharge device 30 is an unauthorized charge/discharge device, it is one of the cases where the server 50 receives the unauthorization information more than once from the single unauthorized connection detecting device 100 and where the server 50 receives the unauthorization information from another unauthorized connection detecting device 100.

In the case where the determination result shows one of the cases where (i) the public key certificate or the certificate revocation list of the second charge/discharge device 30 has not been updated unlike the update request indicates or (ii) the server 50 has received more than once the unauthorization information indicating that the second charge/discharge device 30 is an unauthorized charge/discharge device (S622: YES), the server 50 determines that the second charge/discharge device 30 is an unauthorized charge/discharge device (S624).

In the case where the determination result shows either (i) the public key certificate or the certificate revocation list has been updated according to the update request or (ii) the server 50 has received only once the unauthorization information indicating that the second charge/discharge device 30 is an unauthorized charge/discharge device (S622: NO), the server 50 determines that the second charge/discharge device 30 is not an unauthorized charge/discharge device. Then, the server 50 ends the processing.

That is how the server 50 receives the unauthorization information and executes the processing upon receiving the unauthorization information.

Described next in detail is how the unauthorized connection detecting device 100 and a charge/discharge device connected to the unauthorized connection detecting device 100 mutually authenticate. Hereinafter, the mutual authentication is to be performed between the unauthorized connection detecting device 100 and the first charge/discharge device 20.

Figure 12:
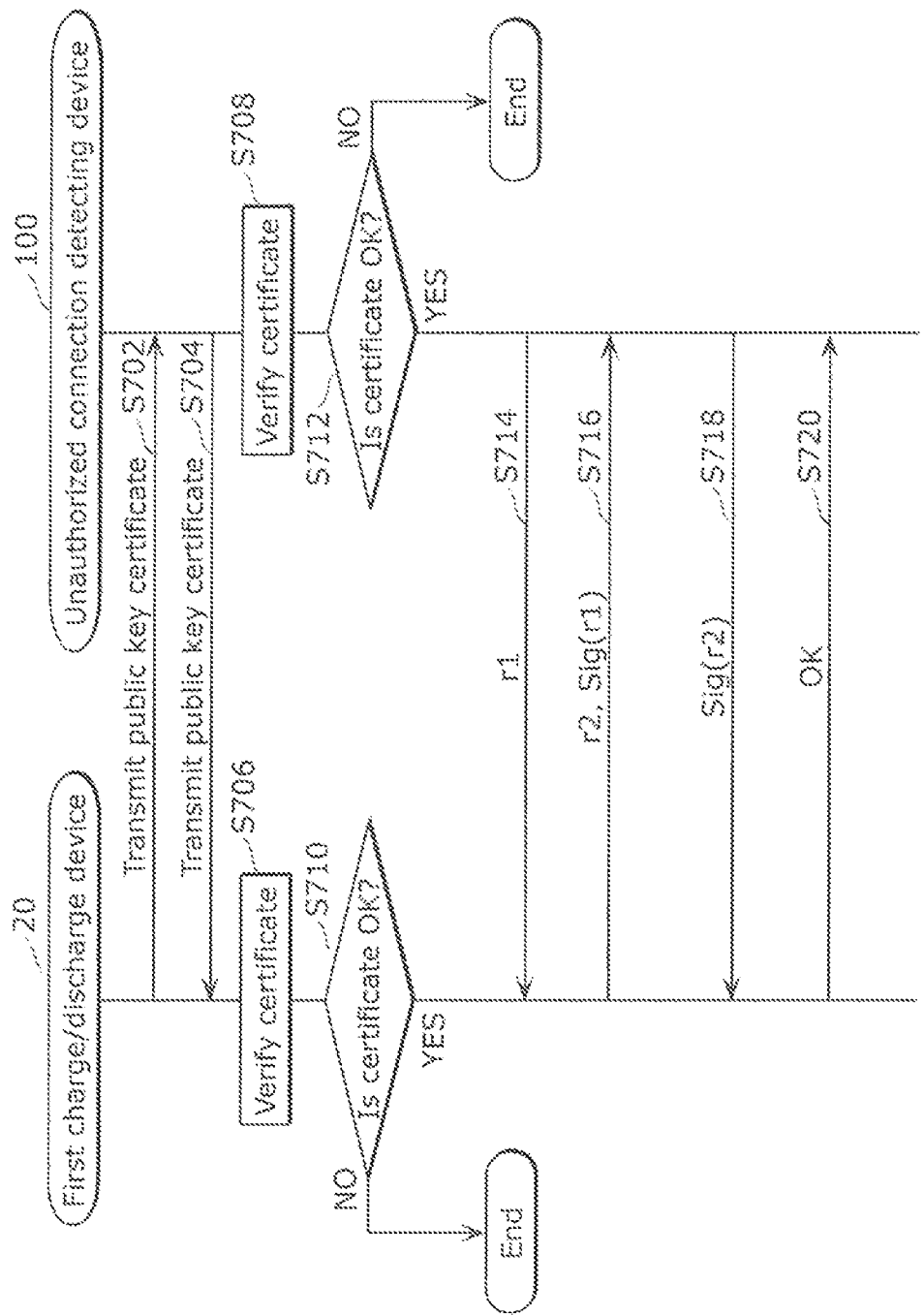
FIG. 12 depicts a flowchart exemplifying how the unauthorized connection detecting device and the first charge/discharge device according to the embodiment mutually authenticate.

FIG. 12 depicts a flowchart exemplifying how the unauthorized connection detecting device 100 and the first charge/discharge device 20 according to the embodiment of the present invention mutually authenticate.

As shown in FIG. 12, the first charge/discharge device 20 first transmits the public key certificate held therein to the certificate verifying unit 180 in the unauthorized connection detecting device 100 (S702). The certificate verifying unit 180 transmits the public key certificate 192 stored in the storage unit 190 to the first charge/discharge device 20 (S704).

The first charge/discharge device 20 then verifies the received certificate (S706). In the case where the certificate is not appropriate (S710: NO), the processing ends. In the case where the certificate is appropriate (S710: YES), the processing proceeds to the next step.

The certificate verifying unit 180 also verifies the received certificate (S708). In the case where the certificate is not appropriate (S712: NO), the processing ends. In the case where the certificate is appropriate (S712: YES), the processing proceeds to the next step.

The certificate verifying unit 180 then generates a random number r1, and transmits the random number r1 to the first charge/discharge device 20 (S714). The first charge/discharge device 20 then receives the random number r1, and generates a signature Sig(r1) with respect to the random number r1 using a secret key SKs described in secret key data for the first charge/discharge device 20, and generates a random number r2.

The first charge/discharge device 20 next transmits the random number r2 and the signature Sig(r1) to the certificate verifying unit 180 (S716). The certificate verifying unit 180 receives the random number r2 and the signature Sig(r1), and verifies the signature using a public key described in the public key certificate for the first charge/discharge device 20.

In the case where the verification result shows that the signature is valid, the certificate verifying unit 180 generates a signature Sig(r2) with respect to the random number r2 using a secret key SK_i described in the secret key data 191, and transmits the signature Sig(r2) to the first charge/discharge device 20 (S718). In the case where the verification result shows that the signature is invalid, the certificate verifying unit 180 returns NG to the first charge/discharge device 20, and shuts off the connection to the first charge/discharge device 20.

The first charge/discharge device 20 then receives the signature Sig(r2) and verifies the signature using a public key described in the public key certificate 192.

In the case where the verification result shows that the signature is valid, the first charge/discharge device 20 returns OK to the certificate verifying unit 180 (S720). In the case where the verification result shows that the signature is invalid, the first charge/discharge device 20 returns NG, and shuts off the connection to the unauthorized connection detecting device 100.

That is how the unauthorized connection detecting device 100 and the first charge/discharge device 20 mutually authenticate.

As described above, the unauthorized connection detecting device 100 according to the embodiment of the present invention detects whether or not the second charge/discharge device 30 is an unauthorized charge/discharge device by (i) obtaining from the first charge/discharge device 20 time information indicating at least one of an issuing date of a public key certificate (first certificate) and an issuing date of a certificate revocation list, (ii) obtaining from the second charge/discharge device 30 expiration date information for a public key certificate (second certificate), and (iii) comparing the time information with the expiration date information. In other words, the unauthorized connection detecting device 100 determines the validity of the second certificate, by estimating the current time based on the time information indicating at least one of the issuing date of the public key certificate and the issuing date of the certificate revocation list. Here, the public key certificate and the certificate revocation list are information which has a signature added by the external server 50, and cannot be easily tampered with. Hence, the unauthorized connection detecting device 100 can detect an unauthorized charge/discharge device without obtaining the current time. Even though the current time is tampered with, the unauthorized connection detecting device 100 can detect an unauthorized charge/discharge device, using the time information that is difficult to be tampered with. Such features allow the unauthorized connection detecting device 100 to detect an unauthorized charge/discharge device into which a cryptographic module of an authentic product has been introduced in an unauthorized manner.

The unauthorized connection detecting device 100 obtains from the first charge/discharge device 20 at least one of the issuing date of the first certificate and the issuing date of the certificate revocation list that have been updated. Here, the at least one of the first certificate and the certificate revocation list is obtained from the external server 50 by the first charge/discharge device 20, and the issuing date is obtained as the time information. Such a feature allows the unauthorized connection detecting device 100 to detect an unauthorized charge/discharge device, using the issuing date of the latest first certificate or certificate revocation list updated by the external server 50.

The unauthorized connection detecting device 100 obtains, as the time information, the newer issuing date of the issuing date of the first certificate and the issuing date of the certificate revocation list. When the expiration date of the second certificate is on or before the time indicated in the time information, the unauthorized connection detecting device 100 detects that the second charge/discharge device 30 is an unauthorized charge/discharge device. In other words, the unauthorized connection detecting device 100 determines the validity of the second certificate, by estimating that the current time is on or after the time indicated in the time information. Such features allow the unauthorized connection detecting device 100 to detect an unauthorized charge/discharge device.

In the case of determining that the charge/discharge sum for the secondary battery 200 exceeds the first threshold based on the charge/discharge history of the secondary battery 200 that the second charge/discharge device 30 has charged and discharged, the unauthorized connection detecting device 100 limits charging or discharging the secondary battery 200 by the second charge/discharge device 30, or issues a warning to the user. Here, when kept connected to the second charge/discharge device 30, the unauthorized connection detecting device 100 cannot obtain, from another charge/discharge device, time information for determining whether or not the second charge/discharge device 30 is an unauthorized charge/discharge device. Hence, when kept connected to the second charge/discharge device 30, the unauthorized connection detecting device 100 limits charging or discharging the secondary battery 200 and issues a warning to the user to encourage the user to disconnect the unauthorized connection detecting device 100 from the second charge/discharge device 30. Such features encourage the user to connect the unauthorized connection detecting device 100 to another charge/discharge device. Consequently, the unauthorized connection detecting device 100 can obtain time information from the other charge/discharge device and determine whether or not the second charge/discharge device is an unauthorized charge/discharge device.

In addition, the unauthorized connection detecting device 100 executes a penalty operation at the first charging or discharging after the charge/discharge threshold determining unit 150 determines that the charge/discharge sum for the secondary battery 200 exceeds the first threshold. In other words, when the secondary battery 200 is charged or discharged next, the unauthorized connection detecting device 100 encourages the user to connect the unauthorized connection detecting device 100 to another charge/discharge device. Such a feature allows the user to connect the unauthorized connection detecting device 100 to another charge/discharge device. Consequently, the unauthorized connection detecting device 100 can determine whether or not the second charge/discharge device 30 is an unauthorized charge/discharge device.

The unauthorized connection detecting device 100 issues a warning when a difference between the charge/discharge sum and the first threshold goes smaller or equal to the second threshold. In other words, the unauthorized connection detecting device 100 encourages the user to connect the unauthorized connection detecting device 100 to another charge/discharge device when the charge/discharge sum comes closer to the first threshold. Such a feature allows the user to connect the unauthorized connection detecting device 100 to another charge/discharge device. Consequently, the unauthorized connection detecting device 100 can determine whether or not the second charge/discharge device 30 is an unauthorized charge/discharge device.

The unauthorized connection detecting device 100 increases the first threshold when connected to the first charge/discharge device 20, which is different from the second charge/discharge device 30, and obtains time information from the first charge/discharge device 20. In other words, the unauthorized connection detecting device 100 gives the user an incentive to connect the unauthorized connection detecting device 100 to the first charge/discharge device 20. Such features allow the user to connect the unauthorized connection detecting device 100 to the first charge/discharge device 20. Consequently, the unauthorized connection detecting device 100 can determine whether or not the second charge/discharge device 30 is an unauthorized charge/discharge device.

In the case of determining that a certificate revocation list held by the charging station 40 acting as the third charge/discharge device is the latest one, the unauthorized connection detecting device 100 determines that the charging station 40 is an authorized charge/discharge device and causes the charging station 40 to notify the external server 50 of unauthorization information for identifying an unauthorized charge/discharge device. In other words, in the case where a charge/discharge device appropriately updates the certificate revocation list, the unauthorized connection detecting device 100 can determine that the charge/discharge device is an authorized charge/discharge device. Such features allow the unauthorized connection detecting device 100 to notify the external server 50 of the unauthorization information through the authorized charge/discharge device.

The unauthorized connection detecting system 1 according to the embodiment of the present invention includes the unauthorized connection detecting device 100 and the server 50 that receives unauthorization information through the charging station 40. The server 50 determines that the charging station 40 is an unauthorized charge/discharge device in one of the cases where (i) a public key certificate or a certificate revocation list held by the charging station has not been updated unlike an update request indicates and (ii) the server 50 has received the unauthorization information indicating that the charging station 40 is an unauthorized charge/discharge device. Hence, in the unauthorized connection detecting system 1, the server 50 can determine whether or not a charge/discharge device at a transmission end is an unauthorized charge/discharge device. The server 50 can refuse to receive the unauthorization information in the case where the charge/discharge device is an unauthorized one and receive the unauthorization information in the case where the charge/discharge device is an authorized one.

Furthermore, the server 50 determines that the second charge/discharge device 30 is an unauthorized charge/discharge device in one of the cases where (i) a public key certificate or a certificate revocation list held by the second charge/discharge device has not been updated unlike an update request indicates and (ii) the server 50 has received more than once unauthorization information indicating that the second charge/discharge device 30 is an unauthorized charge/discharge device. In the unauthorized connection detecting system 1, such features allow the server 50 to determine, after the reception of the unauthorization information, whether or not the charge/discharge device indicated in the received unauthorization information is an unauthorized charge/discharge device, and to reflect the determination result in the certificate revocation list.

[Modification]

Described next is a modification of how the unauthorized connection detecting device 100 notifies the server 50 of an authorized charge/discharge device.

Figure 13:
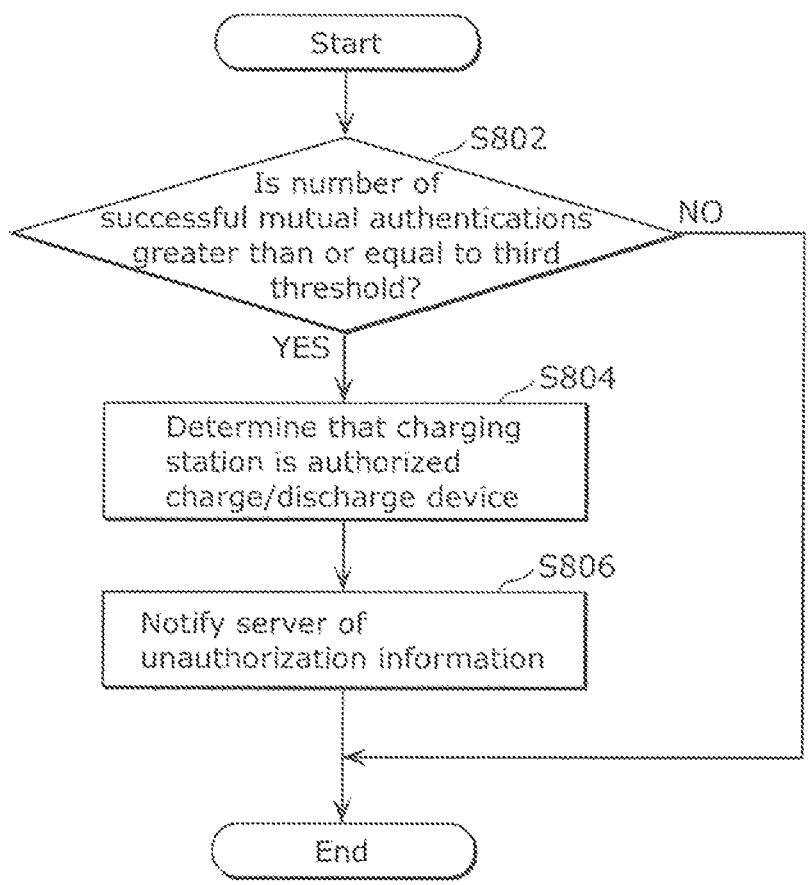
FIG. 13 depicts a flowchart exemplifying how an unauthorized connection detecting device according to a modification of the embodiment of the present invention notifies the server of an unauthorized charge/discharge device.

FIG. 13 depicts a flowchart exemplifying how the unauthorized connection detecting device 100 according to a modification of the embodiment of the present invention notifies the server 50 of an unauthorized charge/discharge device.

As shown in FIG. 13, the unauthorization information notifying unit 170 determines whether or not the number of successful mutual authentications between the unauthorized connection detecting device 100 and the charging station 40 is greater than or equal to a third threshold (S802). The value of the first threshold shall not be limited in particular. Any given value may be set to the third threshold by the user.

In the case where the determination result shows that the number of successful mutual authentications is greater than or equal to the third threshold (S802: YES), the unauthorization information notifying unit 170 determines that the charging station 40 is an authorized charge/discharge device (S804). Here, the unauthorization information notifying unit 170 causes the charging station 40 to notify the server 50 of unauthorization information (S806). In the case where the determination result shows that the number of successful mutual authentications is smaller than the third threshold (S802: NO), the unauthorization information notifying unit 170 ends processing without notifying the server 50 of the unauthorization information.

The processing of the unauthorization information notifying unit 170 which involves determining that the charging station 40 is an authorized charge/discharge device (S804) and causing the charging station 40 to notify the server 50 of the unauthorization information (S806) is similar to the one executed by the unauthorization information notifying unit 170 in FIG. 9 (S504 and S506 in FIG. 9). Hence, the details thereof shall be omitted.

As described above, the unauthorized connection detecting device 100 according to the modification of the embodiment of the present invention performs the following: In the case where the determination result shows that the number of successful mutual authentications between the unauthorized connection detecting device 100 and the charging station 40 is greater than or equal to the third threshold, the unauthorized connection detecting device 100 determines that the charging station 40 is an authorized charge/discharge device, and causes the charging station 40 to notify the server 50 of the unauthorization information. In other words, in the case where the number of successful mutual authentications between the unauthorized connection detecting device 100 and a charge/discharge device is greater than or equal to a predetermined threshold, the unauthorized connection detecting device 100 can determine that the charge/discharge device is an authorized charge/discharge device. Such features allow the unauthorized connection detecting device 100 to notify the external server 50 of the unauthorization information through the authorized charge/discharge device.

Although an exemplary embodiment of unauthorized connection detecting device 100 and a modification thereof have been described in detail above, those skilled in the art will readily appreciate that many modifications are possible in the exemplary embodiment without materially departing from the novel teachings and advantages of this invention. Accordingly, all such modifications are intended to be included within the scope of this invention.

Figure 14:
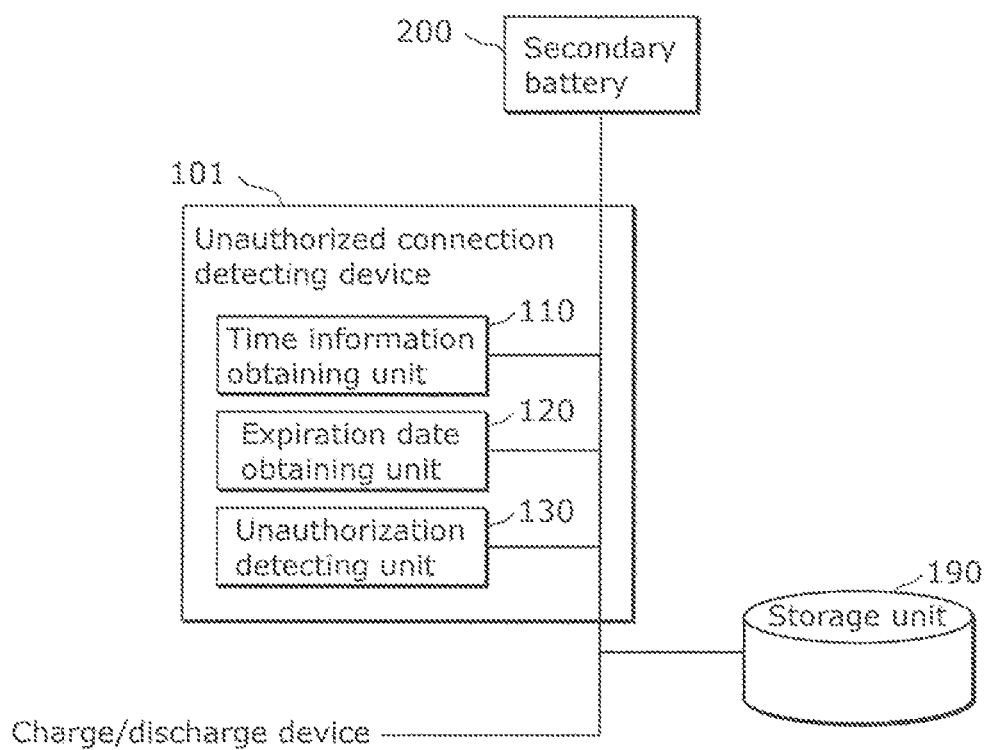
FIG. 14 depicts a block diagram showing a minimal structure of the unauthorized connection detecting device according to the embodiment of the present invention and the modification of the embodiment.

For example, the unauthorized connection detecting device does not have to include all the constituent elements shown in FIG. 2. FIG. 14 depicts a block diagram showing a minimal structure of the unauthorized connection detecting device according to the embodiment of the present invention and the modification of the embodiment. As shown in FIG. 14, an unauthorized connection detecting device 101 includes at least the time information obtaining unit 110, the expiration date obtaining unit 120, and the unauthorization detecting unit 130. Such a structure implements effects similar to those of the unauthorized connection detecting device 100 according to the embodiment and the modification of the embodiment.

It is noted that, in the above embodiment, each of the constituent elements may be implemented in a form of dedicated hardware. The constituent elements may also be implemented through execution of a software program suitable to for each constituent element. Each of the constituent elements may be implemented as a program executing unit, such as a CPU and a processor, which reads out and executes a software program recorded on a recording medium including a hard disc or a semiconductor memory.

In other words, each of the constituent elements included in the unauthorized connection detecting device shown in FIG. 2 or FIG. 14 may be implemented in the form of software. The software which implements the unauthorized connection detecting device of the embodiment is a program which causes a computer to execute steps included in the unauthorized connection detecting method below. In other words, the unauthorized connection detecting method is executed by an unauthorized connection detecting device which detects whether or not a charge/discharge device connected to the unauthorized connection detecting device is an unauthorized charge/discharge device, the charge/discharge device being included in charge/discharge devices for charging or discharging a secondary battery with power. The unauthorized connection detecting method includes: obtaining, as time information, information from a first charge/discharge device when the unauthorized connection detecting device is connected to the first charge/discharge device, the information indicating at least one of (i) an issuing date of a first certificate which is a public key certificate held by the first charge/discharge device for authentication and (ii) an issuing date of a certificate revocation list including revoked public key certificates and held by the first charge/discharge device, and the first charge/discharge device being included in the charge/discharge devices; obtaining expiration date information from a second charge/discharge device when the unauthorized connection detecting device is connected to the second charge/discharge device, the expiration date information indicating an expiration date of a second certificate which is a public key certificate held by the second charge/discharge device for authentication, and the second charge/discharge device being included in the charge/discharge devices; and detecting whether or not the second charge/discharge device is the unauthorized charge/discharge device by comparing the time information with the expiration date information.

The present invention may also be implemented in the form of a computer-readable recording medium, such as a CD-ROM, on which the program is recorded. As a matter of course, the program may be distributed via a recording medium such as a CD-ROM and a transmission medium such as the Internet.

Each of the functional blocks included in the unauthorized connection detecting device shown in FIG. 2 or FIG. 14 may be implemented in the form of a Large Scale Integration (LSI) which is an integrated circuit. Each of the functional blocks may be made as separate individual chips, or as a single chip to include a part or all thereof.

For example, a part of the unauthorized connection detecting device 100 in FIG. 2 other than the storage unit 190 may be implemented in the form of an integrated circuit. The unauthorized connection detecting device 101 shown in FIG. 14 may be implemented in the form of an integrated circuit.

Here, the integrate circuit is referred to as LSI; instead, the integrated circuit may also be referred to as IC, system LSI, super LSI, and ultra LSI, depending on the degree of integration.

Furthermore, the means for circuit integration is not limited to the LSI, and implementation in the form of a dedicated circuit or a general-purpose processor is also available. In addition, it is also acceptable to use a Field Programmable Gate Array (FPGA) that is programmable after the LSI has been manufactured, and a reconfigurable processor in which connections and settings of circuit cells within the LSI are reconfigurable.

Furthermore, if an integrated circuit technology that replaces the LSI appears thorough the progress in the semiconductor technology or an other derived technology, that technology can naturally be used to carry out integration of the constituent elements. Biotechnology can be applied to the integrated circuit technology.

The present invention is applicable to an unauthorized connection detecting device to detect an unauthorized charge/discharge device into which a cryptographic module of an authentic product has been introduced in an unauthorized manner.

REFERENCE SIGNS LIST

1 Unauthorized connection detecting system
10 Power storage device
20 First charge/discharge device
21 House
22 Switching circuit
30 Second charge/discharge device
40 Charging station
50 Server
60 Communications network
100 and 101 Unauthorized connection detecting device
110 Time information obtaining unit
120 Expiration date obtaining unit
130 Unauthorization detecting unit
140 Battery history recording unit
150 Charge/discharge threshold determining unit
160 Penalty executing unit
161 Alert issuing unit
170 Unauthorization information notifying unit
180 Certificate verifying unit
190 Storage unit
191 Secret key data
192 Public key certificate
193 CRL
194 Time information
195 Verification result
196 Charge/discharge history
200 Secondary battery

The invention claimed is:

1. An unauthorized connection detecting device which detects whether or not a charge/discharge device connected to the unauthorized connection detecting device is an unauthorized charge/discharge device, the charge/discharge device being included in charge/discharge devices for charging or discharging a secondary battery with power, and the unauthorized connection detecting device comprising:
a non-transitory memory storing a program; and
a hardware processor configured to execute the program and cause the unauthorized connection detecting device to operate as:
a time information obtaining unit configured to obtain, as time information, information from a first charge/discharge device when the unauthorized connection detecting device is connected to the first charge/discharge device, the information indicating at least one of (i) an issuing date of a first certificate which is a public key certificate held by the first charge/discharge device for authentication and (ii) an issuing date of a certificate revocation list including revoked public key certificates and held by the first charge/discharge device, and the first charge/discharge device being included in the charge/discharge devices;
an expiration date obtaining unit configured to obtain expiration date information from a second charge/discharge device when the unauthorized connection detecting device is disconnected from the first charge/discharge device and is connected to the second charge/discharge device, the expiration date information indicating an expiration date of a second certificate which is a public key certificate held by the second charge/discharge device for authentication, the second charge/discharge device being different from the first charge/discharge device and the second charge/discharge device being included in the charge/discharge devices; and
an unauthorization detecting unit configured to detect whether or not the second charge/discharge device is the unauthorized charge/discharge device by comparing the time information of the first charge/discharge device with the expiration date information of the second charge/discharge device.

2. The unauthorized connection detecting device according to claim 1,
wherein the time information obtaining unit is configured to obtain from the first charge/discharge device the issuing date of at least one of the first certificate and the certificate revocation list that have been updated, the at least one of the first certificate and the certificate revocation list being obtained from an external server by the first charge/discharge device via a communications network, and the issuing date being obtained as the time information.

3. The unauthorized connection detecting device according to claim 1,
wherein the time information obtaining unit is configured to compare the issuing date of the first certificate with the issuing date of the certificate revocation list, and obtain as the time information the information indicating a newer issuing date of the issuing dates, and
the unauthorization detecting unit is configured to detect that the second charge/discharge device is the unauthorized charge/discharge device in the case where the expiration date indicated in the expiration date information is on or before a time indicated in the time information.

4. The unauthorized connection detecting device according to claim 1, further comprising:
a battery history recording unit configured to record on a memory a charge/discharge history showing a history of charging or discharging the secondary battery by the second charge/discharge device;
a charge/discharge threshold determining unit configured to determine whether or not a charge/discharge sum exceeds a first threshold, the charge/discharge sum being indicated in the charge/discharge history recorded on the memory and representing for the secondary battery a total number of charges, a total number of discharges, a total number of charges and discharges, a total amount of charge, a total amount of discharge, or a total amount of charge and discharge; and a penalty executing unit configured to execute a penalty operation in the case where a result of the determination shows that the charge/discharge sum exceeds the first threshold, the penalty operation being one of (i) limiting charging or discharging the secondary battery by the second charge/discharge device and (ii) issuing a warning.

5. The unauthorized connection detecting device according to claim 4,
wherein the penalty executing unit is configured to execute the penalty operation at first charging or discharging the secondary battery by the second charge/discharge device after the charge/discharge threshold determining unit determines that the charge/discharge sum exceeds the first threshold.

6. The unauthorized connection detecting device according to claim 4, further comprising
an alert issuing unit configured to issue a warning when a difference between the charge/discharge sum and the first threshold goes smaller or equal to a second threshold.

7. The unauthorized connection detecting device according to claim 4,
wherein the charge/discharge threshold determining unit is configured to (i) increase the first threshold when the unauthorized connection detecting device is connected to the first charge/discharge device that is different from the second charge/discharge device and the time information obtaining unit obtains the time information from the first charge/discharge device, and (ii) determine whether or not the charge/discharge sum exceeds the increased first threshold.

8. The unauthorized connection detecting device according to claim 1, further comprising
an unauthorization information notifying unit configured to notify an external server of unauthorization information via a third charge/discharge device when the unauthorization detecting unit detects that the second charge/discharge device is the unauthorized charge/discharge device, the unauthorization information being identification information for identifying the second charge/discharge device, and the third charge/discharge device being included in the charge/discharge devices,
wherein the unauthorization information notifying unit is configured to determine whether or not a certificate revocation list held by the third charge/discharge device is a latest certificate revocation list, and
in the case where a result of the determination shows that the certificate revocation list held by the third charge/discharge device is the latest certificate revocation list, the unauthorization information notifying unit is configured to determine that the third charge/discharge device is an authorized charge/discharge device and cause the third charge/discharge device to notify the external server of the unauthorization information.

9. The unauthorized connection detecting device according to claim 1, further comprising
an unauthorization information notifying unit configured to, when the unauthorization detecting unit detects that the second charge/discharge device is the unauthorized charge/discharge device, notify an external server of unauthorization information via a third charge/discharge device included in the charge/discharge devices, the unauthorization information being identification information for identifying the second charge/discharge device,
wherein the unauthorization information notifying unit is configured to determine whether or not the number of successful mutual authentications between the unauthorized connection detecting device and the third charge/discharge device is greater than or equal to a third threshold, and
in the case where a result of the determination shows that the number of the successful mutual authentications is greater than or equal to the third threshold, the unauthorization information notifying unit is configured to determine that the third charge/discharge device is an authorized charge/discharge device, and cause the third charge/discharge device to notify the external server of the unauthorization information.

10. An unauthorized connection detecting system comprising:
the unauthorized connection detecting device, according to claim 1, which detects whether or not a charge/discharge device connected to the unauthorized connection detecting device is an unauthorized charge/discharge device, the charge/discharge device being included in charge/discharge devices for charging or discharging the secondary battery with power; and
a server which receives unauthorization information that is identification information for identifying the unauthorized charge/discharge device detected by the unauthorized connection detecting device,
wherein the server determines that the second charge/discharge device is the unauthorized charge/discharge device in the case where:
the server receives the unauthorization information indicating that the second charge/discharge device is the unauthorized charge/discharge device; and
either (i) a public key certificate or a certificate revocation list held by the second charge/discharge device has not been updated unlike an update request indicates, or (ii) the server has received more than once unauthorization information indicating that the second charge/discharge device is the unauthorized charge/discharge device.

11. An unauthorized connection detecting method executed by a unauthorized connection detecting device which detects whether or not a charge/discharge device connected to the unauthorized connection detecting device is an unauthorized charge/discharge device, the charge/discharge device being included in charge/discharge devices for charging or discharging a secondary battery with power, and the unauthorized connection detecting method comprising:
obtaining, as time information, information from a first charge/discharge device when the unauthorized connection detecting device is connected to the first charge/discharge device, the information indicating at least one of (i) an issuing date of a first certificate which is a public key certificate held by the first charge/discharge device for authentication and (ii) an issuing date of a certificate revocation list including revoked public key certificates and held by the first charge/discharge device, and the first charge/discharge device being included in the charge/discharge devices;
obtaining expiration date information from a second charge/discharge device when the unauthorized connection detecting device is disconnected from the first charge/discharge device and is connected to the second charge/discharge device, the expiration date information indicating an expiration date of a second certificate which is a public key certificate held by the second charge/discharge device for authentication, the second charge/discharge device being different from the first charge/discharge device and the second charge/discharge device being included in the charge/discharge devices; and detecting whether or not the second charge/discharge device is the unauthorized charge/discharge device by comparing the time information of the first charge/discharge device with the expiration date information of the second charge/discharge device.

12. A non-transitory computer-readable recording medium storing a program for use in a computer to execute steps included in an unauthorized connection detecting method which detects whether or not a charge/discharge device connected to the unauthorized connection detecting device is an unauthorized charge/discharge device, the charge/discharge device being included in charge/discharge devices for charging or discharging a secondary battery with power, and the unauthorized connection detecting method comprising:

obtaining, as time information, information from a first charge/discharge device when the unauthorized connection detecting device is connected to the first charge/discharge device, the information indicating at least one of (i) an issuing date of a first certificate which is a public key certificate held by the first charge/discharge device for authentication and (ii) an issuing date of a certificate revocation list including revoked public key certificates and held by the first charge/discharge device, and the first charge/discharge device being included in the charge/discharge devices;

obtaining expiration date information from a second charge/discharge device when the unauthorized connection detecting device is disconnected from the first charge/discharge device and is connected to the second charge/discharge device, the expiration date information indicating an expiration date of a second certificate which is a public key certificate held by the second charge/discharge device for authentication, the second charge/discharge device being different from the first charge/discharge device and the second charge/discharge device being included in the charge/discharge devices; and detecting whether or not the second charge/discharge device is the unauthorized charge/discharge device by comparing the time information of the first charge/discharge device with the expiration date information of the second charge/discharge device.

13. An integrated circuit which detects whether or not a charge/discharge device connected to an unauthorized connection detecting device is an unauthorized charge/discharge device, the charge/discharge device being included in charge/discharge devices for charging or discharging a secondary battery with power, the integrated circuit comprising:

a time information obtaining circuit configured to obtain, as time information, information from a first charge/discharge device when the unauthorized connection detecting device is connected to the first charge/discharge device, the information indicating at least one of (i) an issuing date of a first certificate which is a public key certificate held by the first charge/discharge device for authentication and (ii) an issuing date of a certificate revocation list including revoked public key certificates and held by the first charge/discharge device, and the first charge/discharge device being included in the charge/discharge devices;

an expiration date obtaining circuit configured to obtain expiration date information from a second charge/discharge device when the unauthorized connection detecting device is disconnected from the first charge/discharge device and is connected to the second charge/discharge device, the expiration date information indicating an expiration date of a second certificate which is a public key certificate held by the second charge/discharge device for authentication, the second charge/discharge device being different from the first charge/discharge device and the second charge/discharge device being included in the charge/discharge devices; and an unauthorization detecting circuit configured to detect whether or not the second charge/discharge device is the unauthorized charge/discharge device by comparing the time information of the first charge/discharge device with the expiration date information of the second charge/discharge device.

* * * * *